US011218553B2

(12) United States Patent
Filippou et al.

(10) Patent No.: US 11,218,553 B2
(45) Date of Patent: Jan. 4, 2022

(54) INTER-MEC SYSTEM COMMUNICATION FOR V2X SERVICES

(71) Applicant: Intel Corporation, Santa Clara, CA (US)

(72) Inventors: Miltiadis Filippou, Munich (DE); Dario Sabella, Munich (DE); Markus Dominik Mueck, Unterhaching (DE); Honglei Miao, Nuremberg (DE)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 16/235,111

(22) Filed: Dec. 28, 2018

(65) Prior Publication Data

US 2019/0141142 A1 May 9, 2019

Related U.S. Application Data

(60) Provisional application No. 62/685,633, filed on Jun. 15, 2018, provisional application No. 62/638,611, filed on Mar. 5, 2018.

(51) Int. Cl.
*H04L 29/08* (2006.01)
*H04W 4/40* (2018.01)

(52) U.S. Cl.
CPC .............. *H04L 67/16* (2013.01); *H04L 67/12* (2013.01); *H04W 4/40* (2018.02); *H04L 67/2842* (2013.01)

(58) Field of Classification Search
None
See application file for complete search history.

(56) References Cited

U.S. PATENT DOCUMENTS

| 2004/0267876 | A1* | 12/2004 | Kakivaya | H04L 67/16 709/200 |
| 2019/0053108 | A1* | 2/2019 | Trang | H04L 67/1012 |
| 2019/0075501 | A1* | 3/2019 | Chen | H04L 41/0896 |

OTHER PUBLICATIONS

"Discussion paper: proposal of new WI on "MECV2XAP"", Intel, Vodafone, Saguna, VIAVI solutions, KDDI, ITRI, Huawei, ZTE MEC(18)000018, (2018), 5 pgs.
"Mobile Edge Computing (MEC); Framework and Reference Architecture", ETSI GS MEC 003 V1.1.1 (Mar. 2016), (2016), 18 pgs.

* cited by examiner

*Primary Examiner* — Christopher M Crutchfield
*Assistant Examiner* — Alan L Lindenbaum
(74) *Attorney, Agent, or Firm* — Schwegman Lundberg & Woessner, P.A.

(57) ABSTRACT

Methods, apparatus, systems and machine-readable storage media of a multi-access edge computing (MEC) component, of a first MEC system, for discovering platforms in MEC systems, are described. In an example, a list of MEC system identifiers is received from a dedicated reference point. The MEC system identifiers includes a system identifier of a second, different MEC system. A list of available MEC hosts in the second MEC system that fulfill a predefined requirement is received. A list of shareable services on the first MEC system is determined. Information is provided to the second MEC system regarding the list of shareable services on the first MEC system.

26 Claims, 23 Drawing Sheets

INTER-MEC SYSTEM COMMUNICATION FOR V2X SERVICES

PRIORITY CLAIM

This application claims the benefit of priority to U.S. Application Ser. No. 62/685,633, filed Jun. 15, 2018, and to U.S. Application Ser. No. 62/638,611, filed Mar. 5, 2018, both of which are incorporated herein by reference in their entirety.

TECHNICAL FIELD

Embodiments described herein generally relate to edge computing and related distributed computing environments, and in particular, to security, verification, and management techniques usable with services operable at edge computing platforms.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing." MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, coordination, and resource management, especially in complex mobility settings where many participants (devices, hosts, service providers, operators) are involved. As a result, many proposed architectures have not achieved the full benefits that edge computing is intended to offer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for providing inter-MEC system communication for various services, such as V2X services, to enable information transfer to and from MEC applications. In addition, information transferred between MEC applications may be in a secure way. MEC systems, platforms, and available applications are discoverable via various described communication techniques.

In addition, other examples are directed to sharing cached information between vehicles. For example, two vehicles traveling in opposite directions may have very useful information. A recent past event, such as an accident, pot hole, etc., for one vehicle is future information for a vehicle traveling in the opposite direction that has not yet arrived at the event.

The present techniques support a variety of edge computing installations, by enabling validated services to be offered to and investigated by application endpoints, which offers an improvement in security and operability. The present techniques may also extend the ability of an edge environment and individual entities to improve performance of computing and network resources, and achieve reliable edge services with low latency or at a high bandwidth.

The following systems and techniques may be implemented in, or augment, a variety of distributed, virtualized, or managed networking environments. These include environments in which network services are implemented within using MEC platforms, network function virtualization (NFV), or fully virtualized 4G/5G network configurations. Thus, various references are made to defined types of telecommunications equipment and architectures. Additionally, in the present disclosure, reference is made to LTE, 5G, eNBs, gNBs, and like radio access network concepts, but it is intended that the present techniques may be utilized with variations or substitution of the type of network deployed. (For example, all described solutions referencing LTE may also be applicable in new radio (NR)/5G or like next generation systems). MEC computation is any computation which is executed in sufficient geographical proximity of a user equipment. A multi-access edge computing (MEC) component may relate to any computational element which is in sufficient geographical proximity of a user equipment, including a smartphone, vehicular communication component, etc.

Figure 1:
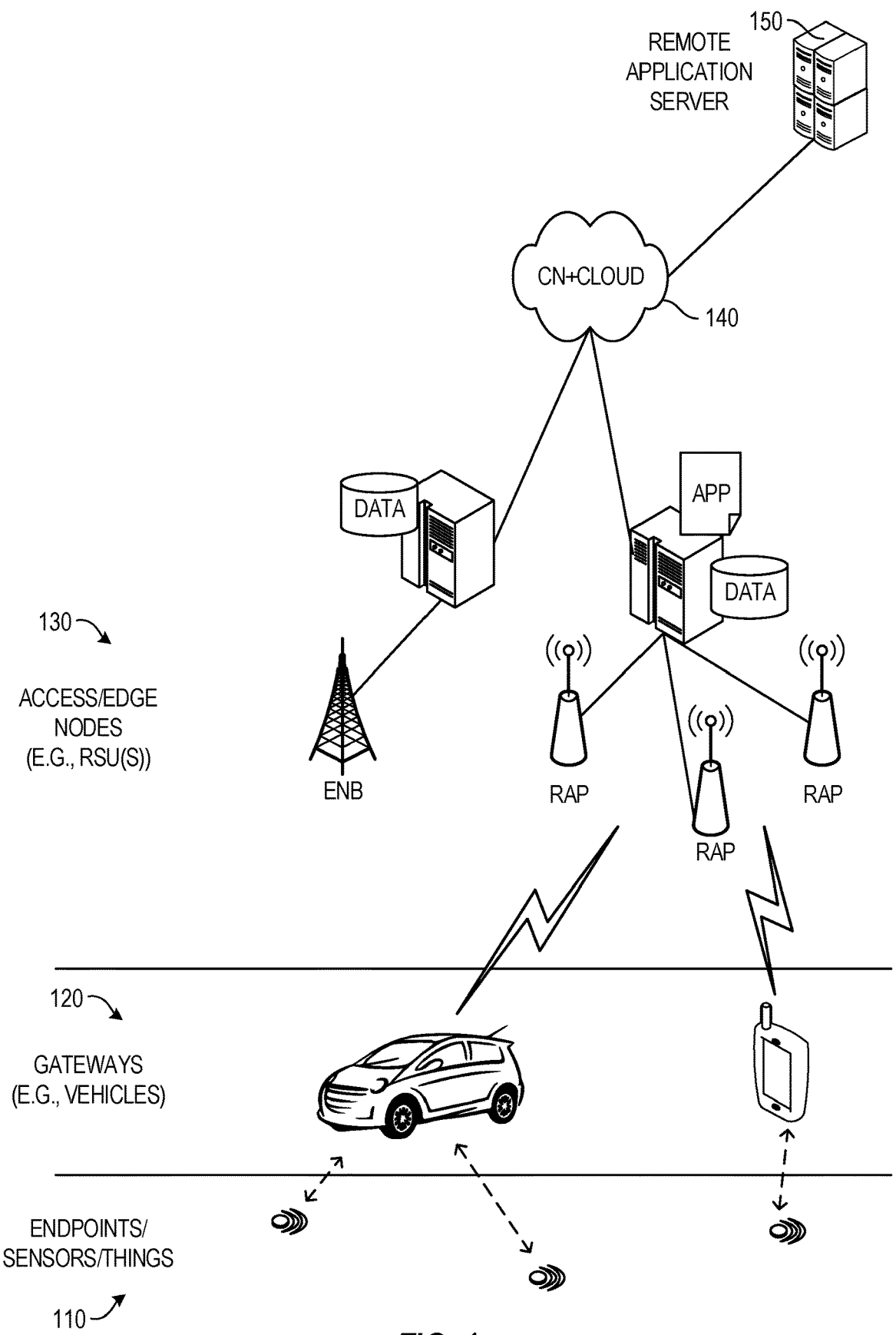
FIG. 1 illustrates devices and network entities in a dynamic communications environment, according to an example.

FIG. 1 illustrates devices and network entities in a multi-access communications environment. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 2:
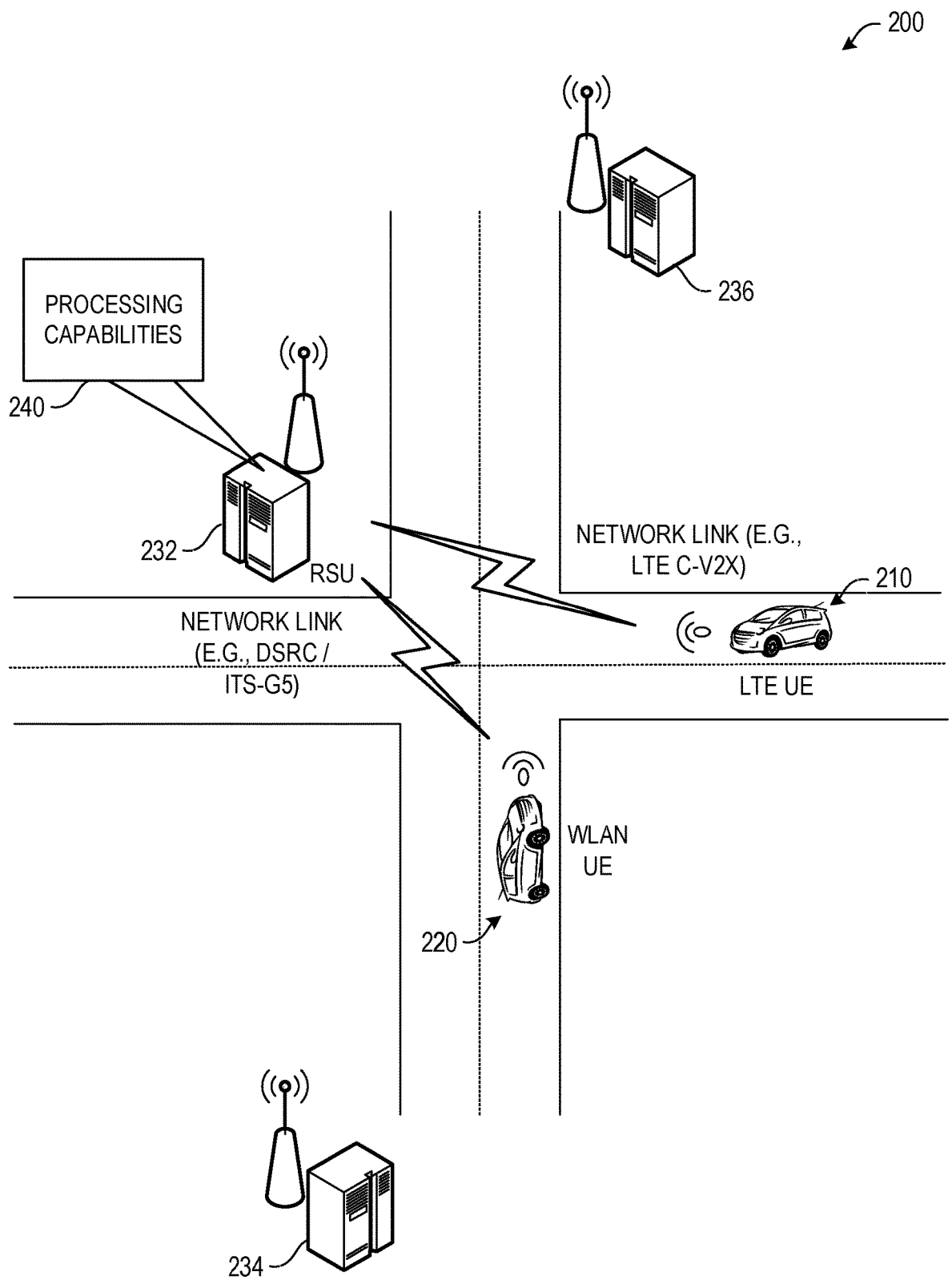
FIG. 2 illustrates an operative arrangement of a network and mobile user equipment, according to an example.

FIG. 2 illustrates an operative arrangement 200 of network and vehicle user equipment, in which various embodiments may be practiced. In arrangement 200, vehicle user equipment (vUE) 210, 220 may operate with a defined communication system (e.g., using a LTE C-V2X WWAN, or a SRC/ETSI ITS-G5 (WLAN) communication network, etc.). In embodiments, a Road Side Unit (RSU) 232 may provide processing services 240 by which the vUEs 210 and 220 may communicate with one another (or to other services), execute services individually and with each other, or access similar aspects of coordinated or device-specific edge computing services. In embodiments, the processing services 240 may be provided by a MEC host (e.g., an ETSI MEC host), MEC platform, or other MEC entity implemented in or by hardware of the RSU 232. In this example, the RSU 232 may be a stationary RSU, such as an eNB-type RSU or other like infrastructure. In other embodiments, the RSU 232 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 220, 210 transition from, and to, operation at other RSUs, such as RSUs 234, 236, and other network nodes not shown.

Figure 3:
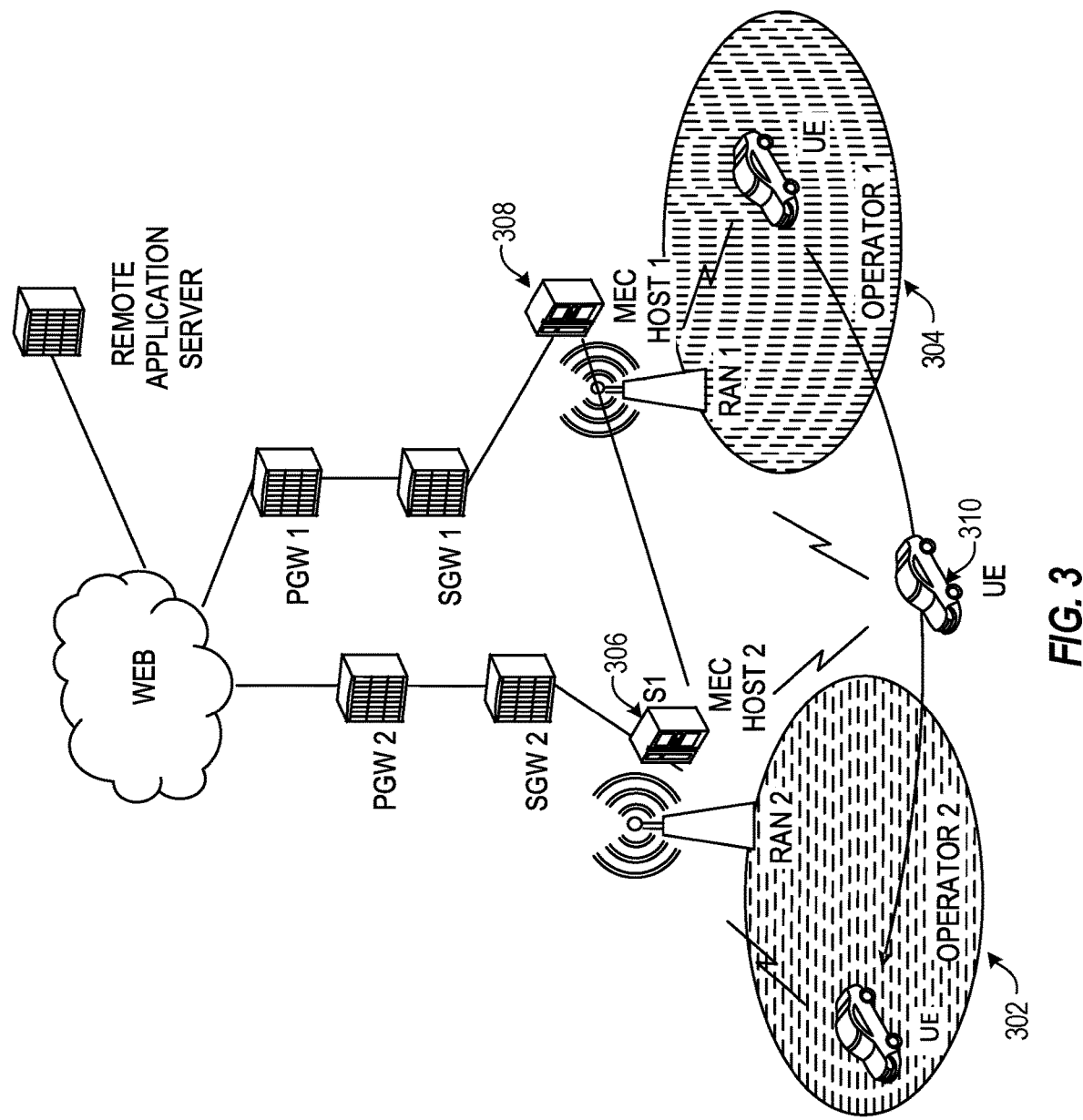
FIG. 3 illustrates a block diagram for a V2X (vehicle-to-everything) communication system utilizing Multi-access Edge Computing (MEC) technology, according to an example.

FIG. 3 depicts a block diagram for an example V2X (vehicle-to-everything) communication system utilizing Multi-access Edge Computing (MEC) technology, such as in the context of the ETSI GS MEC 003 specification, providing support for V2X applications. Specifically, FIG. 3 depicts a V2X communication system involving the use of a MEC system, where a Road Operator (or an ITS operator) is aiming at offering V2X services in a cross-country, cross-operator, cross-vendor environment. A variety of interfaces, including Mp3 (a reference point for internal mobile edge management, used for control communication between mobile edge platforms), Mx2 (a reference point for external access, used by a UE application to request the mobile edge system to run an application in the mobile edge system, or to move an application in or out of the mobile edge system) within and from the MEC system are shown.

One of the most challenging (but also most frequent) situation is when the ITS operator attempts to provide the same V2X service to all vehicles connected to different operators (e.g., 302 and 304)—even in temporary absence of radio coverage 310. This use case often is complicated by the presence of multiple MEC vendors (e.g., 306 and 308), which leads to the need to enable communication between different MEC systems.

Various disclose examples describe how inter-MEC system communication may be achieved. In addition, the described inter-MEC communication allows discovery of V2X services across different MEC systems. Further, inter-platform information may be exposed to other MEC systems via the disclosed communication systems.

Figure 4:
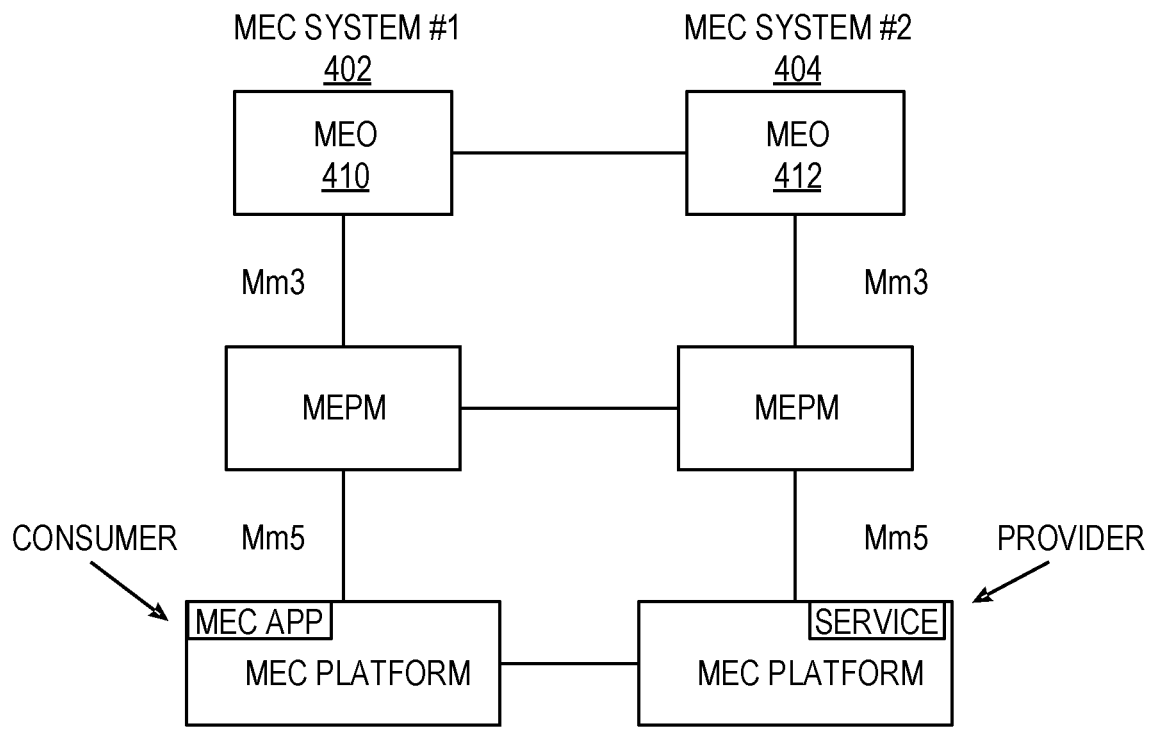
FIG. 4 illustrates a block diagram of a layered/hierarchical approach for inter-MEC system communication, according to an example.

In an example, layered/hierarchical communications may be used for inter-MEC system communication. A first example for establishing and managing inter-MEC system communication, includes a layered/hierarchical approach. This approach involves information of different granularity levels, which can be possibly combined towards forming a layered/hierarchical approach. Specifically, FIG. 4 includes a block diagram that illustrates this layered/hierarchical approach for inter-MEC system communication. MEC Orchestrators (MEOs) may be used to communicated between the two MEC Systems 402 and 404. Three different levels of inter-MEC system communication may be utilized in this approach: high, medium and low-level communication levels, as discussed with reference to FIGS. 5 to 7 in the following paragraphs.

Figure 5:
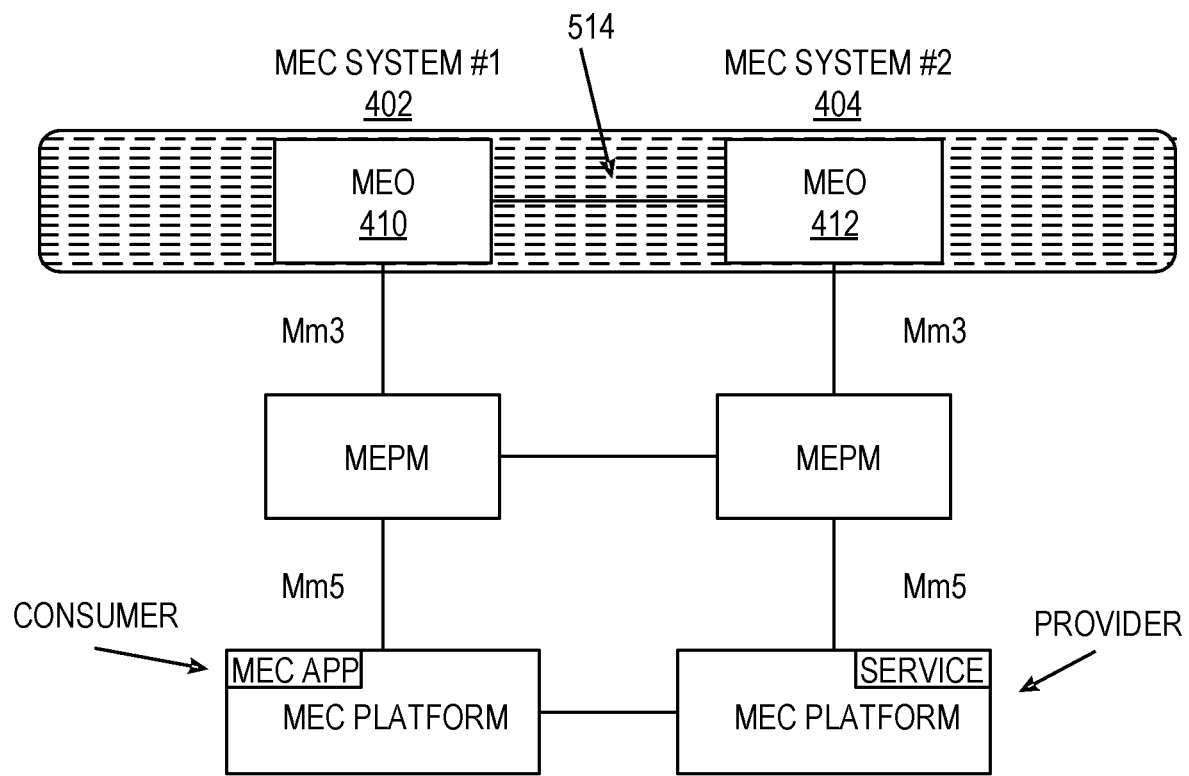
FIG. 5 illustrates a block diagram of high-level inter-MEC system communication, according to an example.

At the high-level of the inter-MEC system inter-system communication among MEC Orchestrators (MEOs) for MEC system discovery. FIG. 5 includes a block diagram that illustrates high-level inter-MEC system communication. Focusing, as an example, on a V2X communication system, the Intelligent Transportation System (ITS) operator, or the mobile operator, deals with different deployed. MEC systems to provide a unique ITS service in a certain "ITS service area", such as in a country or across the border.

This set of MEC system IDs is communicated to all MEC Orchestrators (MEOs) 410 and 412, e.g. by means of a dedicated reference point (Mx5) 514, so that every MEC system 402 and 404 is aware of the set of other systems to communicate with. This level of communication, via the proposed Mx5 connection (Mx designating a reference point outside of the MEC system), is highlighted in FIG. 5.

Such inter-MEO communication may take place periodically, albeit infrequently, depending on the rate of deploying new MEC systems over the "ITS service area".

Figure 6:
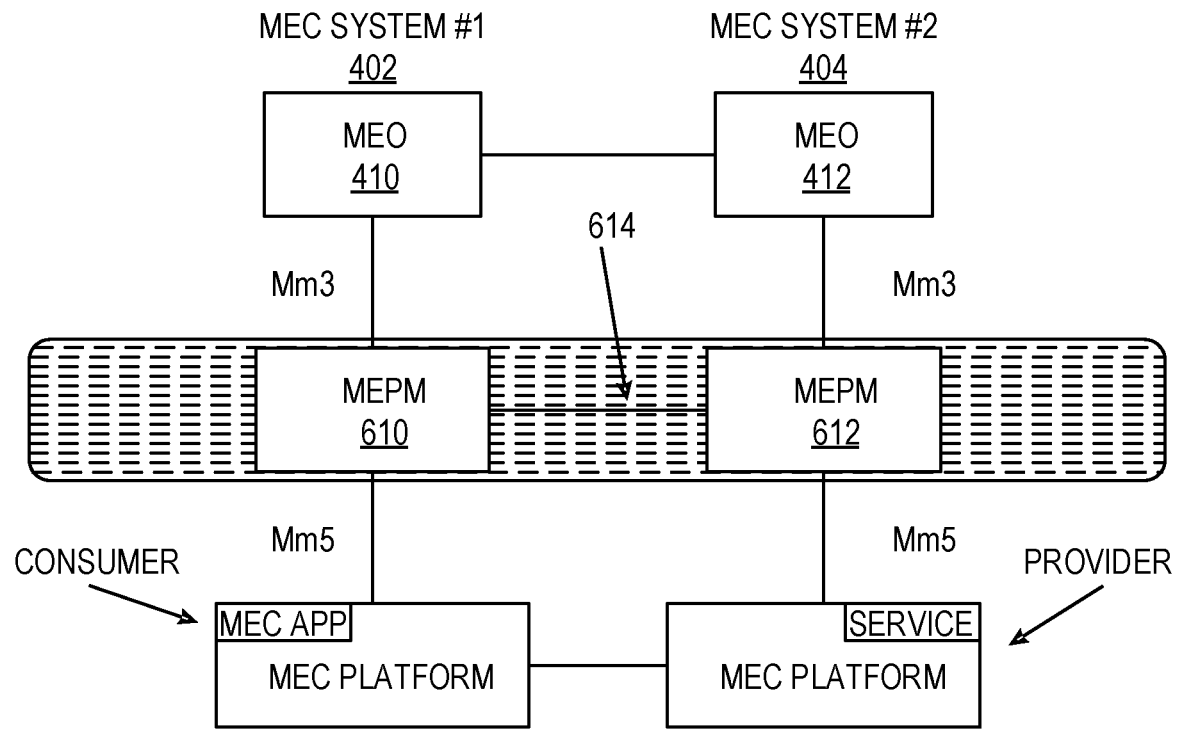
FIG. 6 illustrates a block diagram of a medium-level inter-MEC system communication, according to an example.

At the medium-level of the inter-MEC system inter-system communication among MEC Platform Managers (MEPMs) 610 and 612 for MEC Platform discovery. FIG. 6 includes a block diagram that illustrates medium-level inter-MEC system communication. Assume that two given MEC 402 and 404 systems can communicate, as indicated by inter-MEO information exchange. Then, prior to establishing direct communication between two MEC Platforms, each of which belongs to one of the two MEC systems 402 and 404, the MEPM of each system 610 and 612 needs to form the set of available MEC hosts that fulfill predefined requirements. For example, hosts that are not currently under maintenance may be identified and those hosts that fulfill processing, memory or storage requirements may be identified. The identifiers of the identified hosts may be used to identify the set of available MEC hosts. For example, the predefined requirements may be an amount of free capacity for the processing, memory, or storage or a combination of these. The capacity may be from the perspective of the MEC hosts. This set of available and capable MEC hosts is communicated to the other system's MEPM, such as by means of a dedicated reference point (Mx4) 614, so that every MEC Platform is aware of the sets of other systems' MEC platforms it can potentially communicate with. This level of communication, via the proposed Mx4 connection 614, is highlighted in FIG. 6.

Such inter-MEPM communication will be only carried out after high-level inter-system communication between MEOs 410 and 412 is successfully completed (e.g., from a "system handshake"). Given a "handshake" is performed, its frequency of occurrence may vary, depending on the fashion with which the availability of a MEC host changes (e.g., based on MEC load fluctuations caused by changes in vehicle spatial densification over time).

Figure 7:
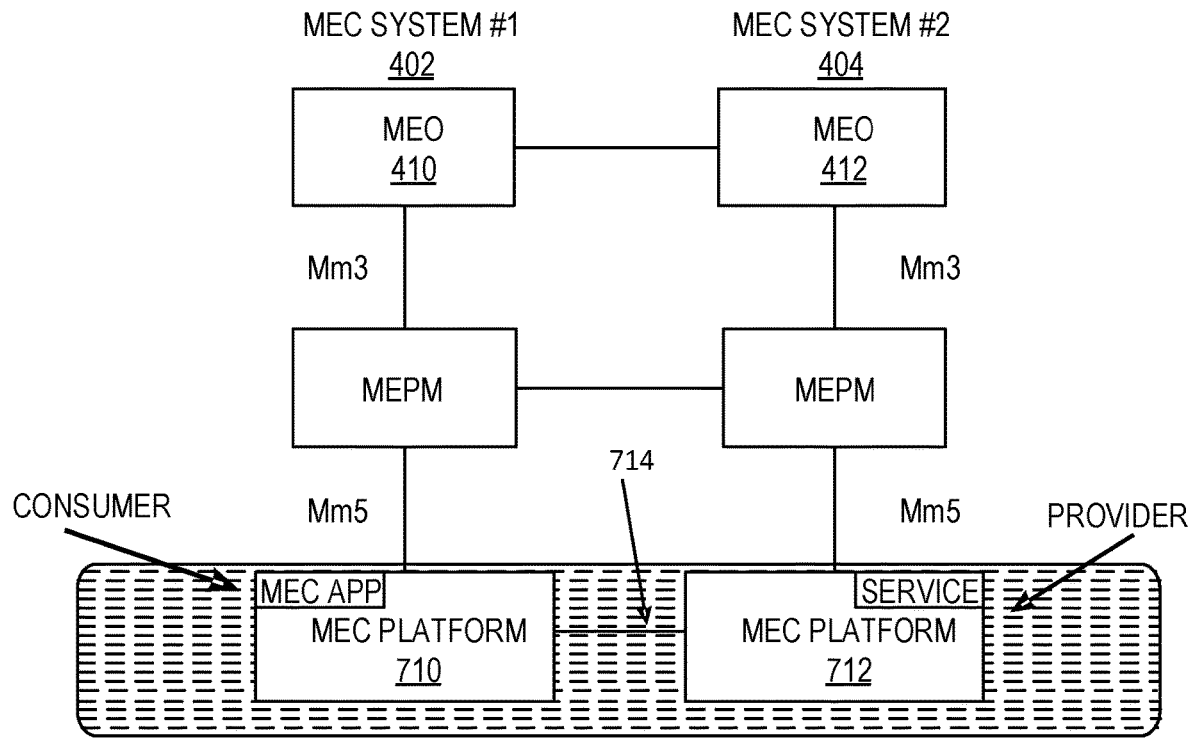
FIG. 7 illustrates a block diagram of a low-level inter-MEC system communication, according to an example.

At the low-level of the inter-MEC system inter-system communication among MEC Platforms for inter-MEC Platform information exposure. FIG. 7 includes a block diagram that illustrates low-level inter-MEC system communication. Every MEC Platform 710 and 712 should indicate the inter-system sharing ability of each service it supports by using a tag (i.e. "shareable"/"private"). This way, services which should only be consumed locally (at the same host, or only within an intra-system "zone" e.g. due to privacy issues), will be excluded from inter-system inter-platform sharing. Therefore, only a subset of the supported services will be exposed to other MEC systems (e.g. V2X API). The set of sharable services can be then directly communicated to the other (accessible) systems' MEC Platforms. The sharable services may be communicated to the other MEC platforms via a dedicated reference point (Mx3) 714. This level of communication is highlighted in FIG. 7.

Figure 8:
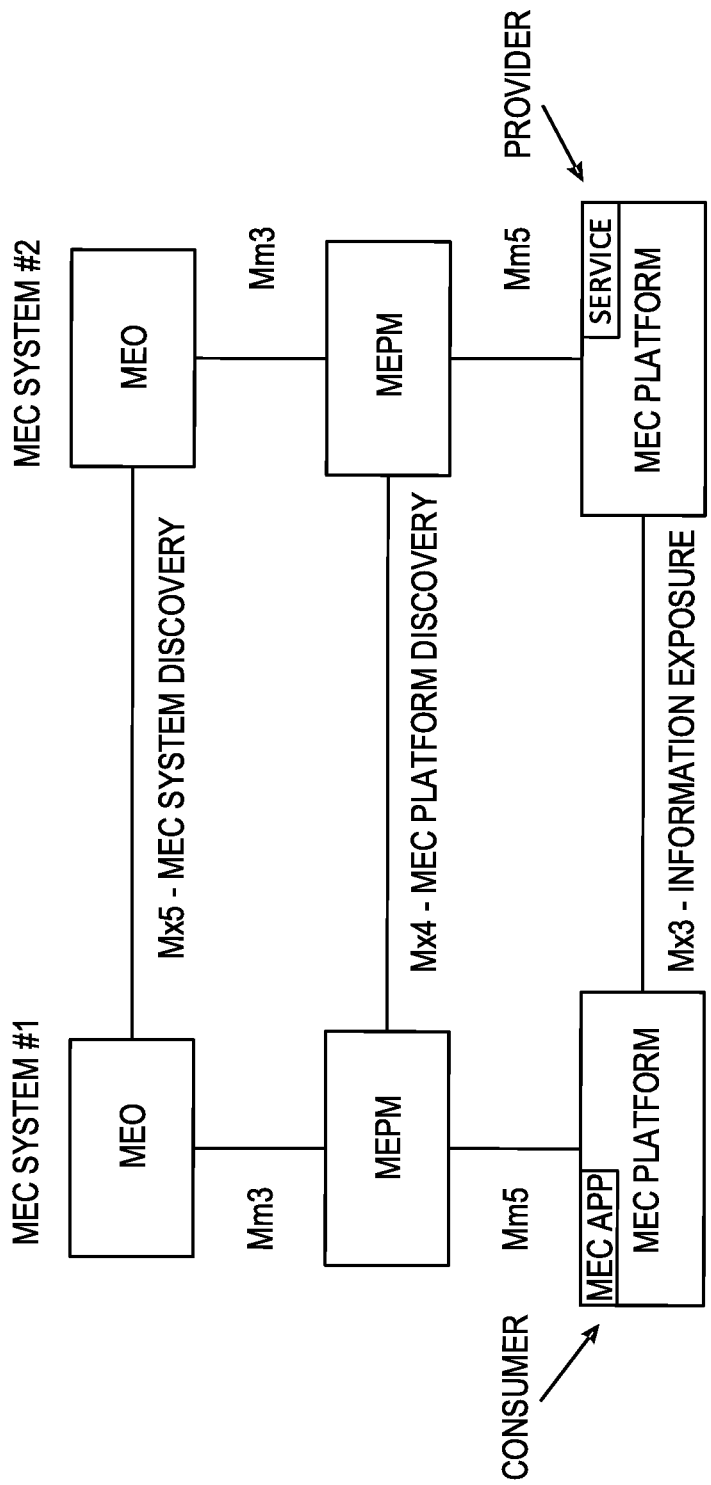
FIG. 8 illustrates a block diagram of a reference points for use in inter-MEC system communication, according to an example.

FIG. 8 includes a block diagram that illustrates multiple proposed reference points for use in inter-MEC system communication. Altogether, the proposed hierarchical approach, together with the additionally considered reference points (i.e., Mx3, Mx4, and Mx5), is illustrated in FIG. 8.

In another example, a two-level hierarchy communications system may be used for all inter-MEC system communications. According to this approach, a system's MEO, in response to the need one or more MEC Platform(s) may consume information from other MEC platforms running on different MEC systems, will seek and directly provide the IDs of the available/accessible MEC Platforms of other accessible MEC systems.

Figure 9:
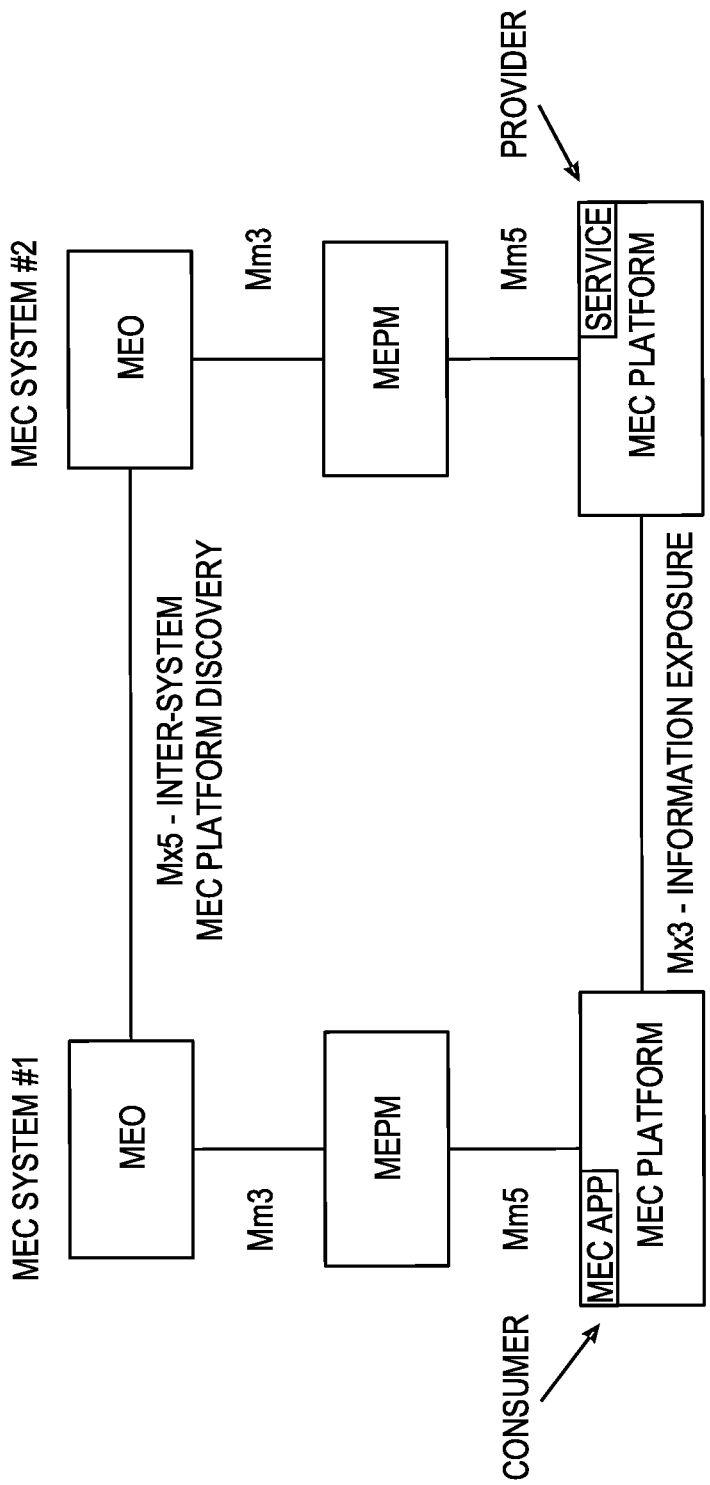
FIG. 9 illustrates a block diagram of a two-level hierarchy approach for inter-MEC system communication, according to an example.

FIG. 9 includes a block diagram that illustrates a two-level hierarchy approach for inter-MEC system communication. As a result, having performed the above-described inter-MEO communication, the various available MEC Platforms of the accessible MEC systems will be able to directly exchange service-related information. As previously mentioned, these MEC Platforms will only expose the set of services marked as "shareable" to other, out-of-system MEC Platforms.

In comparison to the previously described three-layer approach, a two-level approach is expected to exhibit latency gains end-to-end. For example there may be latency gains from the moment a MEC application instantiated at a MEC host indicates the need to consume a service up to the point where the sought service is available for consumption. The latency gains, however, come at the cost of more frequent utilization of the interface between MEOs, which may be challenging for dense MEC system deployments.

In other examples, an over the top communications may be used to coordinate all inter-MEC system communications. According to this approach, when a MEC Platform indicates the need to consume information available by other MEC Platforms belonging to different MEC systems, it will first pose the request to the MEO. Then, the latter entity (MEO) will communicate the request to other MEOs in order for the latter to provide the list of "sharable" services available by other out-of-system MEC Platforms along with their respective IDs.

Figure 10:
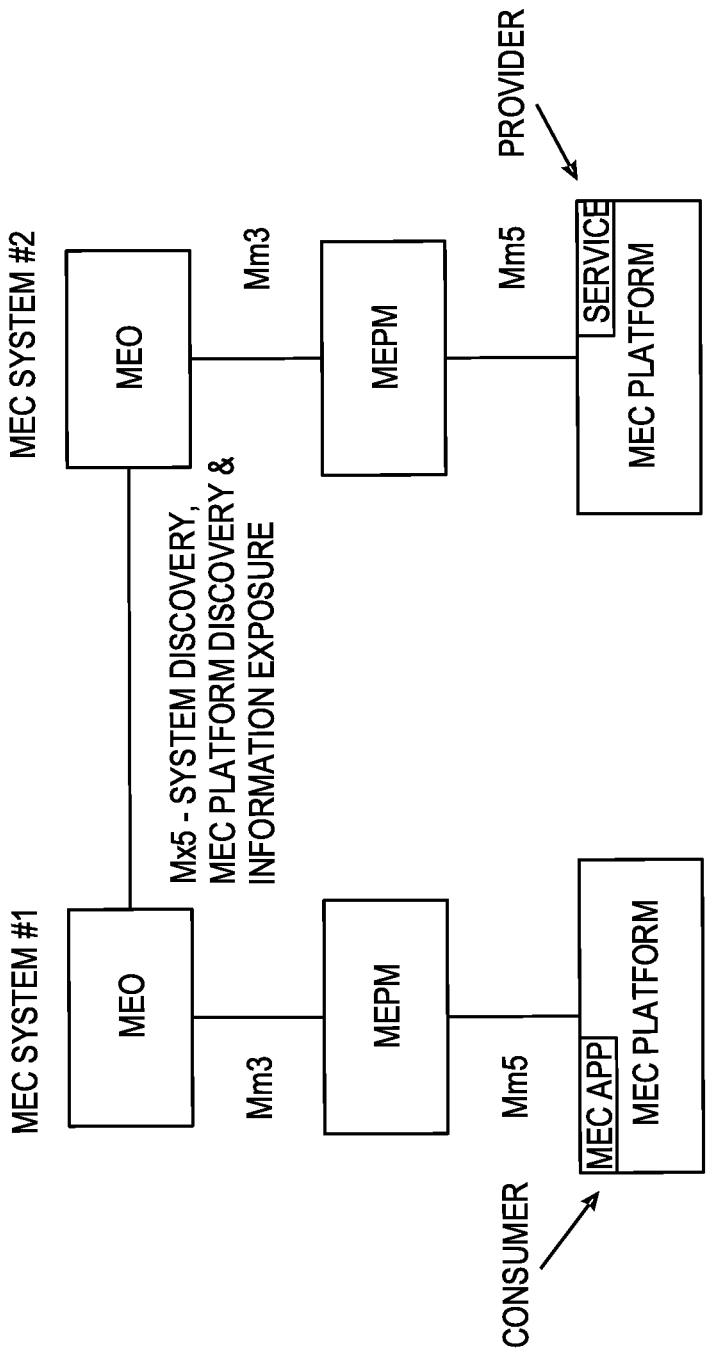
FIG. 10 illustrates a block diagram of an over-the-top approach for inter-MEC system communication, according to an example.

FIG. 10 includes a block diagram that illustrates an over-the-top approach for inter-MEC system communication. The benefit of this approach is that only a reference point will be utilized for inter-system communication. The benefit of using one reference points has the drawback of increased end-to-end latency, especially when dense deployments/large "ITS service areas" are considered. This drawback may affect scalability of MEC deployments.

Figure 11:
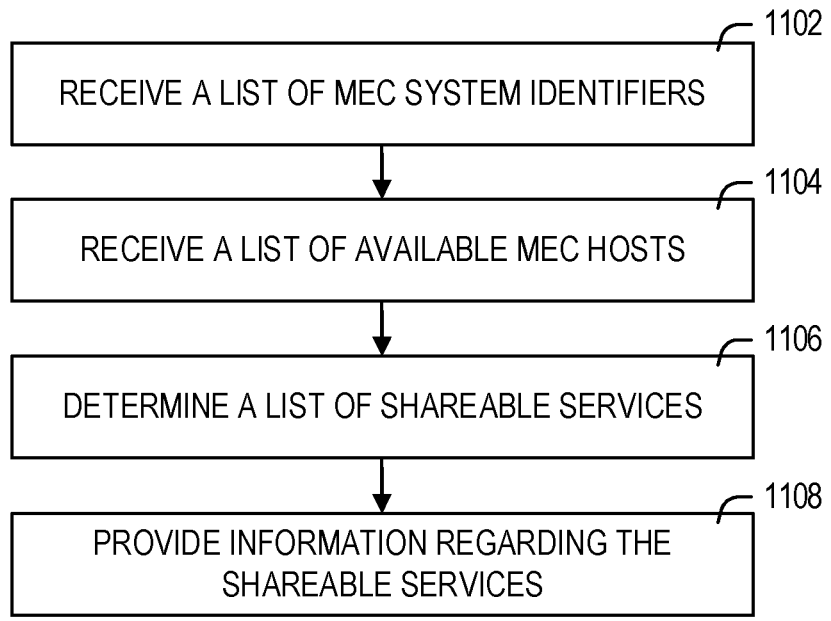
FIG. 11 illustrates a flow diagram for discovering platforms in MEC systems, according to an example.

FIG. 11 illustrates a flow diagram for discovering platforms in MEC systems, according to an example. At 1102, a list of MEC system identifiers is received. The list of MEC system identifiers may be received from a dedicated reference point. The list of MEC system identifiers is received via a MEC orchestrator (MEO). A different MEC system identifier may be included in the list of MEC system identifiers. At 1104, a list of available MEC hosts in the second MEC system that fulfill a predefined requirements is received. In some examples, the predefined requirement may be based on processing capacity or memory capacity of the MEC host. At 1106, a list of shareable services on the first MEC system is determined. At 1106, information is provided to the second MEC system regarding the list of shareable services on the first MEC system.

An intelligent transportation system (ITS) service area may be represented by a system identifier of the first MEC system and the system identifier of the second MEC system. In some example, a set of available MEC hosts within the first MEC system that fulfill a local predefined requirement is determined. Identifiers that identify the set of available MEC hosts may be transmitted to the second MEC system. In some examples, a change in vehicle spatial densification over a time period is determined. The system identifier for the first MEC system may be transmitted to the second MEC system based on the change in vehicle spatial densification.

In some example, service identifiers that indicate shareable services of the second MEC system are received. A list of available service identifiers available within the first MEC system may be transmitted to the second MEC system. The list of available service identifiers may include an identifier from the service identifiers received from the second MEC system.

In another example, a list of shareable services within the first MEC system that are shareable with other MEC systems is determined. A list of shareable service identifiers that identify the list of shareable services may be transmitted to the second MEC system.

In addition to the above, various examples are directed to cache sharing and data coherence management in a vehicular environment. Vehicle-to-Everything (V2X) applications are expected to gain substantial market acceptance based on long term evolution (LTE) cellular V2X (C-V2X) and institute of electrical and electronics engineers (IEEE) 802.11p (dedicated short-range communications (DSRC)) technology. A given vehicle may act as a communications access node (Edge Node or similar) to other vehicles. Such a node may contain a local cache which possibly contains information that other vehicles may wish to access to (such as traffic information, local accident information, etc.). An issue with providing such data is how to maintain relevant information in the local cache of a vehicle serving as access node. In some examples, maintaining relevant data may be achieved through Cache-Transfer between vehicles passing each other and heading in opposite directions.

Figure 12:
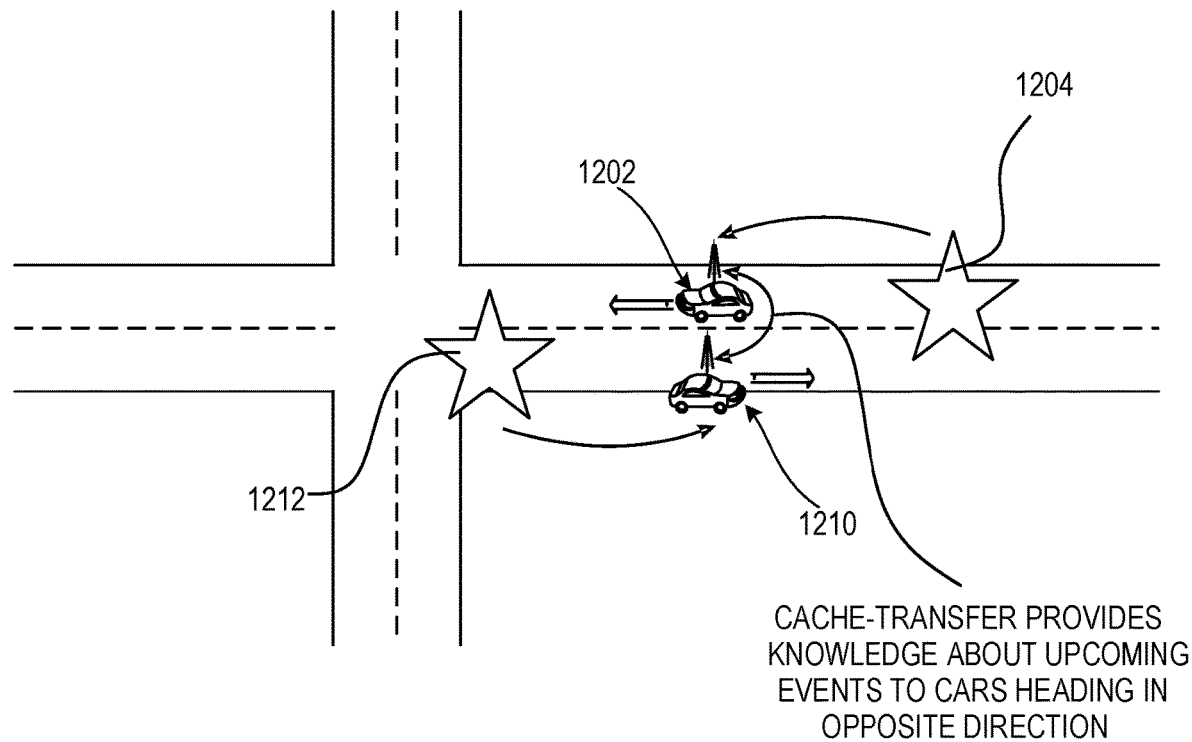
FIG. 12 illustrates a diagram of maintaining a cache between two vehicles, according to an example.

In some examples, certain vehicles may serve as an access node to which other vehicles may connect to. This access node may provide information out of its internal cache relating to locally relevant information (e.g., accidents, traffic jam, etc.). The cache may keep up to date through cache-data-exchange by vehicles passing each other and heading in to opposite directions. FIG. 12 illustrates a diagram of maintaining a cache between two vehicles, accordingly to an example. Vehicle 1202 may have knowledge about an event 1204 that the vehicle 1202 has passed, but that is being approached by vehicle 1210. While vehicle 1210 may have cache information regarding event 1212 that has been passed by the vehicle 1210 but is being approached by vehicle 1202. The event may be an accident, traffic jam, pot hole, non-moving vehicle, road work, lane closure, etc. The vehicles may transfer data regarding the events 1204 and 1212 to one another.

In legacy approaches, it is not possible to have a full cache-transfer between mobile access nodes. Thus, the corresponding caches are mainly relying on "past" information and have very limited access to "future" information. Approaches disclosed herein may resolve this issue and thus substantially improve the overall system efficiency.

In a situation of multiple vehicles. A (small) number of these vehicles may be able to operate as communication access nodes including a cache. The cache may typically contain past information, such as observations on traffic situations (e.g., accidents, traffic jams, etc.), etc. Any information that is not contained in the cache may typically be accessed through a wide-area Network, such as a cellular LTE network.

In some other embodiments, any vehicle can serve as an access/leading node for a number of vehicles in the proximity with relatively slow changing distance to the access/leading node. The access/leading node may be selected by network or group of vehicles. In some embodiments, the network may select the vehicle with the best channel condition to the network among those vehicles in a cluster which can be identified by the network according to their locations. In some other embodiments, the group of vehicles may form a communication cluster based on certain rule, the leading/access node of the communication cluster can be jointly selected by the group of vehicles in the cluster. For example, the vehicle with the best average channel conditions to all other vehicles in the cluster may be chosen as the access/leading node.

Two vehicles with access node capabilities may exchange data through a side-link communication or similar when they are passing by each other (heading in opposite directions). Each of the vehicles will have ("past") data in the respective cache that is required by the second vehicle driving in the opposite direction since this data corresponds to its "future". Information exchange may be prepared of as much cache data as possible when both vehicles pass next to each other. This procedure may be either i) coordinated by a wide area network (such as an LTE network) or ii) coordinated between the two concerned vehicles themselves. The details of these procedure are described as follows.

Figure 13:
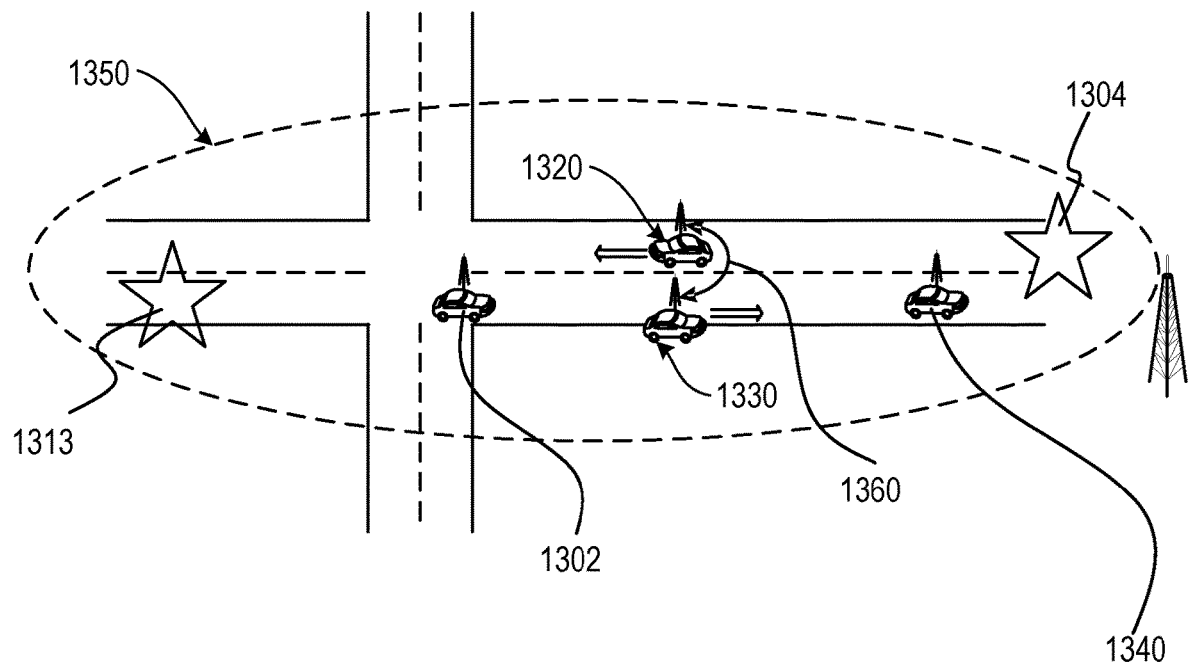
FIG. 13 illustrates a diagram of a wide area network assisted cache information exchange, according to an example.

FIG. 13 illustrates a diagram of a wide area network 1350 assisted cache information exchange. A vehicle 1302 may be informed by a wide area network about an upcoming opportunity to exchange cache data. A cache exchange 1360 between vehicles 1320 and 1330 may occur following triggers by the wide area network. Vehicle 1340 may have also exchanged cache information with the vehicle 1320, allowing the updated cache of the vehicle 1340 to access information on future events, such as event 1304.

Figure 14:
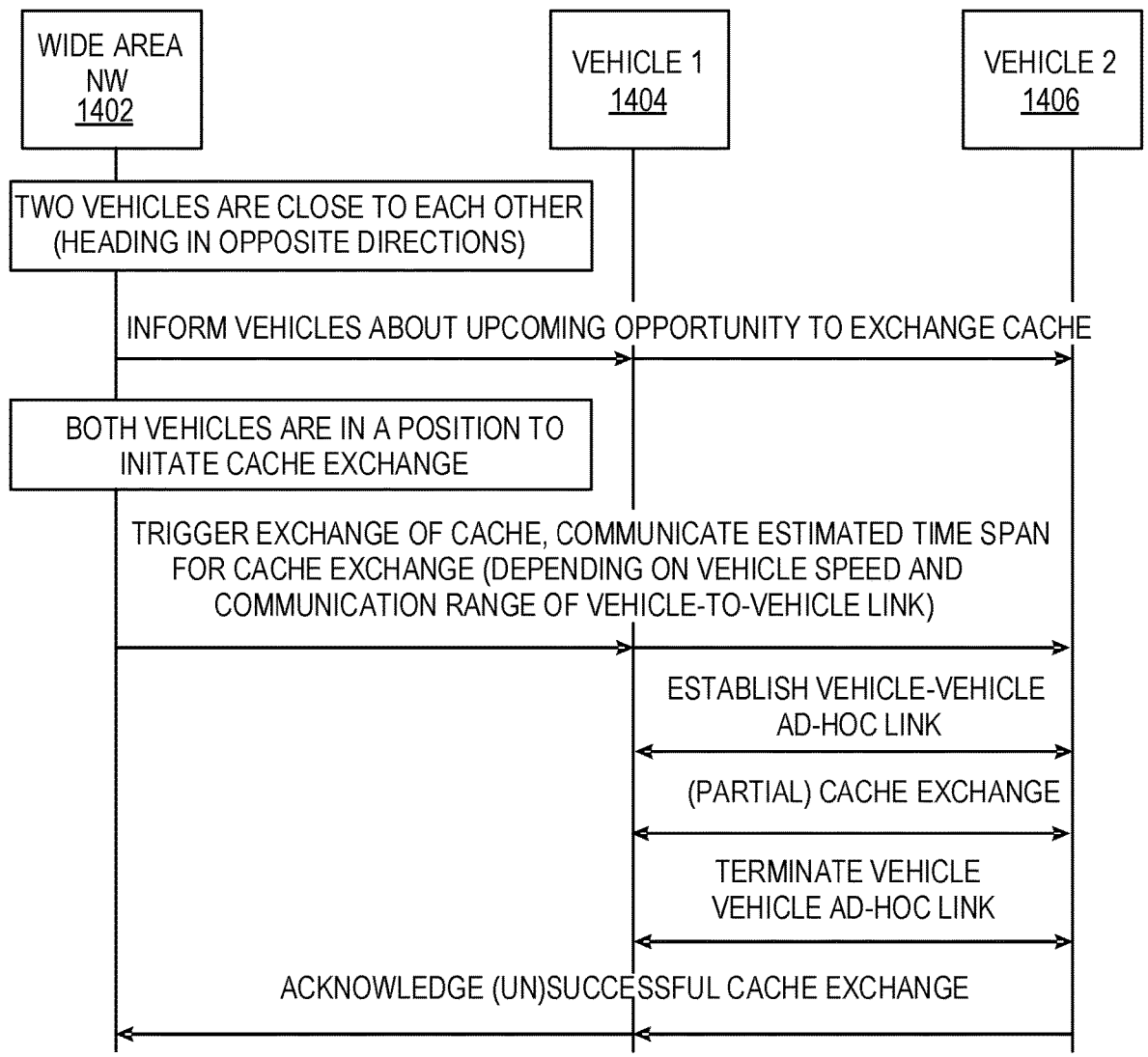
FIG. 14 illustrates a sequence diagram of operations for a network assisted cache information exchange, according to an example.

FIG. 14 illustrates a sequence diagram of operations for a network assisted cache information exchange, according to an example. A wide area network 1402 may determine that a first vehicle 1404 and a second vehicle 1406 are close to one area and heading in different directions. In an example, the vehicles 1404 and 1406 are heading in opposite directions. The wide area network 1402 may inform both vehicles 1404 and 1406 about an upcoming opportunity to exchange data. Once the vehicles 1404 and 1406 are close enough to one another to initiate a cache exchange, the wide area network 1402 may trigger exchange of the cache information. The wide area network 1402 may provide a time span for the cache exchange based on the speeds of the vehicles 1404 and 1406. The vehicles 1404 and 1406 may then establish an ad-hoc link to do a cache exchange. The cache exchange may be a partial exchange. The ad-link may be terminated and either or both of the vehicles 1404 and 1406 may indicate the successful/unsuccessful status of the exchange.

Figure 15:
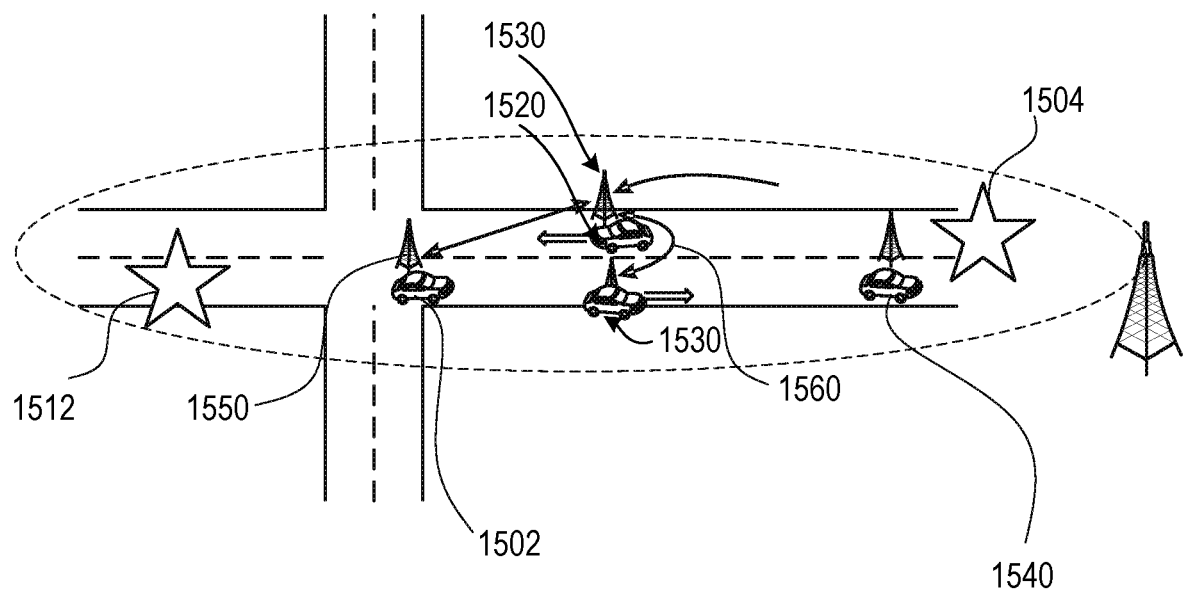
FIG. 15 illustrates a diagram of a self-coordinated cache information exchange, according to an example.

In another approach, a vehicle may coordinate a cache information exchange with another vehicle. FIG. 15 illustrates a diagram of a self-coordinated cache information exchange, according to an example. A vehicle 1502 may broadcast a message or receive a broadcast message from near-by vehicles. For example, vehicle 1520 may receive the message. In another example, base stations 1550 and 1560 may broadcast the messages or may transmit their own messages regarding upcoming exchange opportunities. Previously exchanged messages between vehicle 1530 and the vehicle 1520 may be used to establish an ad-hoc link between the two vehicles. A cache exchange 1560 between vehicles 1520 and 1530 may occur following agreed procedures between the two vehicles. The procedures may be agreed to during an initial handshake. Vehicle 1540 may have also exchanged cache information with the vehicle 1520, allowing the updated cache of the vehicle 1540 to access information on future events, such as event 1504.

Figure 16:
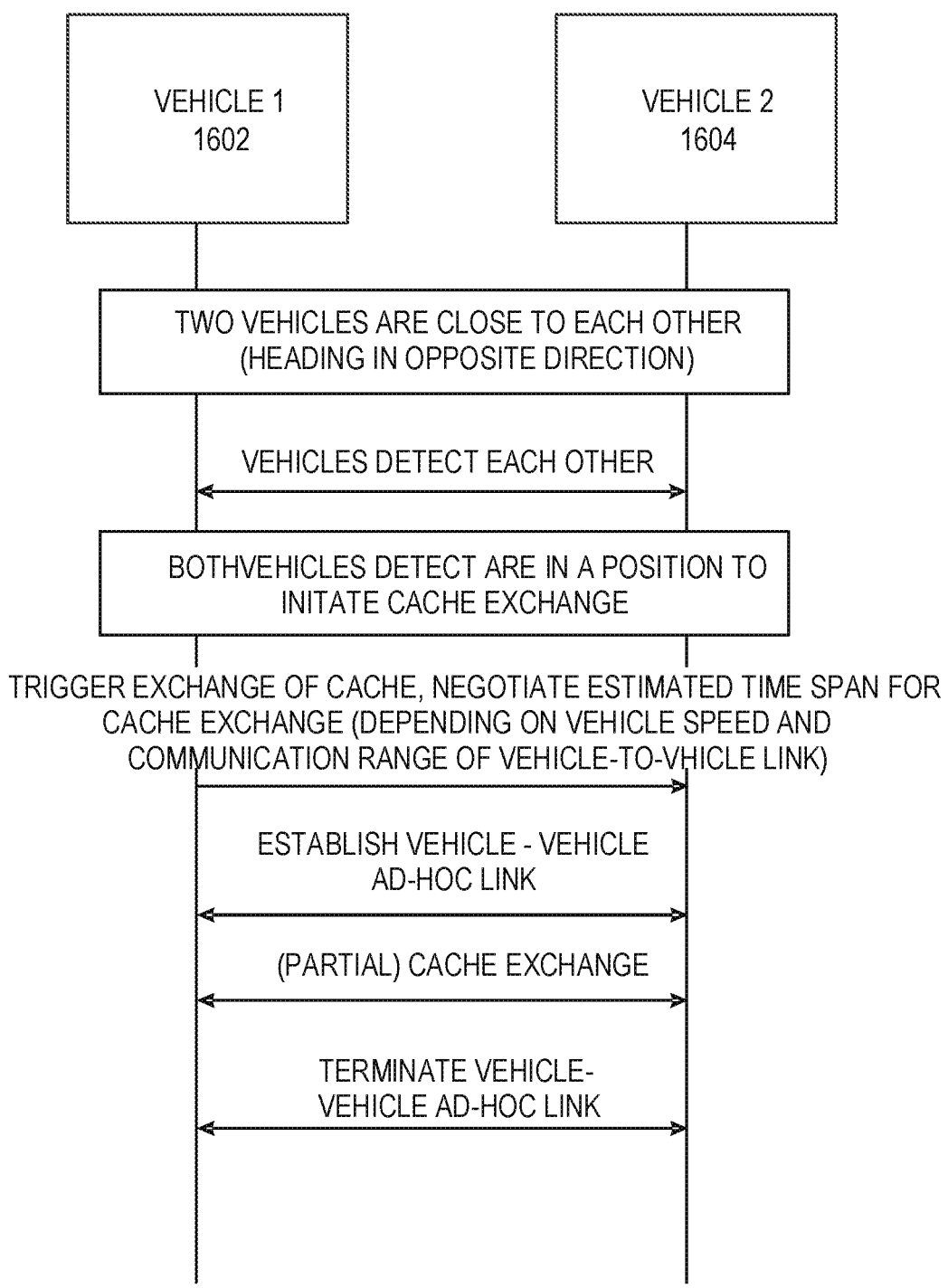
FIG. 16 illustrates a sequence diagram of operations for a select-coordinated cache information exchange, according to an example.

FIG. 16 illustrates a sequence diagram of operations for a select-coordinated cache information exchange, according to an example. Vehicles 1602 and 1604 may be heading towards one another in opposite directions. The vehicles 1602 and 1604 may detect each other and initiate a cache exchange. The vehicles 1602 and 1604 may exchange current speeds to determine an estimated time span available for the cache exchange. An ad-hoc link may be established and then used to do a cache or partial cache exchange.

Coherence Protocols may apply cache coherence in multi-node systems with the aim to prevent that two clients would see different values of the same shared data. The chosen protocol may implement the basic requirements for coherence, and in particular it can be tailor made for the target system/application and according to the nature of the system (communication speed, scale of the system, etc.).

Coherence protocols can be classified as directory-based or snooping. Directory-based protocols are where the data being shared may be placed in a common directory that maintains the coherence between caches. Snooping (Snoopy/Broadcast) protocols are where the cache may have a coherency controller inside, called a snooper. The snoopers may monitor every transaction on a bus. If a transaction modifying a shared cache block appears on the bus, the snoopers may check whether their caches have the same copy of the shared block. If a cache has the copy of the shared block, the corresponding snooper may perform an action to ensure cache coherency.

One advantage of using bus snooping is that the process may be faster than directory based coherency mechanism. The data being shared may be placed in a common directory that maintains the coherence between caches in a directory-based system. Bus snooping may normally be faster if there is enough bandwidth, because all transactions are a request/response seen by all processors.

One possible disadvantage of bus snooping may be limited scalability. Frequent snooping on a cache may cause a race with an access from a processor, thus it can increase cache access time and power consumption. Each of the requests may have to be broadcast to all nodes in a system. It means that the size of the (physical or logical) bus and the bandwidth it provides may grow as the system becomes larger. Since the bus snooping may not scale well, larger cache systems may use directory-based coherence protocols.

Coherence protocols may be applied to Cache Sharing in a Vehicular Environments, where an integrated MEC-Fog system can identify suitable protocols according to the nature of the system (e.g. number/density of vehicles, number/density of roadside units (RSUs), . . . ) and, dynamically switch between different protocols. Switching between different protocols may be based on different network conditions (e.g. coverage/capacity).

As an example, in highly dense urban scenarios, with low mobility (e.g. traffic jam in big cities) a high number of nodes (and related cache information) may be updated with a directory based protocol, and by assigning few RSUs the role of common caching directories (located at suitable MEC hosts). On the other hand, in presence of smaller (and more dynamic) scenarios, faster protocols (e.g. snooping) can be chosen. In these cases, also local aggregators of FOG nodes may play the role of snoopers.

Furthermore, in the vehicular context, cache/database coherence may not be required in all cases. Indeed, the environmental information may evolve all the time and an aspect may be that a given car has the most updated information available such that it can adapt in the best possible way to the surrounding situation. In case that one car has older information than another car (for example, information on some accident may not yet be available to one car), the concerned cars may apply different decisions depending on the information is available to them. For other information, however, it may be critical to have databases synchronized. For example, if a given information leads to conflicting actions. As an example of conflicting actions, old information may indicate to a first car that a lane is open in one direction and an updated information may indicated to a second car that the lane is open in the opposite direction. This cache coherence issue may lead to an accident. Embodiments herein may introduce a cache/database coherence flag to the various information available in a car, possibly linked with a timing indication indicating when the information was collected (through sensors). Furthermore, embodiments herein may indicate for various information types how relevant a cache/database coherence is, i.e. embodiments herein may use the attributes "COHERENCE IS ESSENTIAL", "COHERENCE IS BENEFICIAL", "COHERENCE IS OPTIONAL", "COHERENCE IS NOT REQUIRED". Alternatively, embodiments herein may use attributes such as "UP TO DATE COHERENCE IS REQUIRED", "MINUTES-old COHERENCE IS SUFFICIENT", "HOURS-old COHERENCE IS SUFFICIENT", "NO COHERENCE IS REQUIRED".

This adaptive mechanism may be driven by the exploitation of suitable MEC application program interfaces (APIs) (services) available in the MEC platforms. Example of MEC APIs that may be exploited are:
  Radio network information (RNI) service APIs (based on the ETSI GS MEC 012 specification);
  Location APIs (based on the ETSI GS MEC 013 specification); or Bandwidth Management API (based on the ETSI GS MEC 015 specification).

In fact, these APIs can be used by MEC and Fog nodes to gather relevant information that can provide guidance on how to dynamically configure the system, based on nodes positions and speed, and also on network conditions.

As noted in the discussion above, the techniques discussed herein may be applicable to use with MEC and like Fog architectures, including those defined by ETSI MEC specifications and like standards bodies. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE C-V2X) exchange data, provide data to aggregation points, or access data in databases, to ascertain an overview of the local situation derived from a multitude of sensors (e.g., by various cars, roadside units, etc.).

Figure 17:
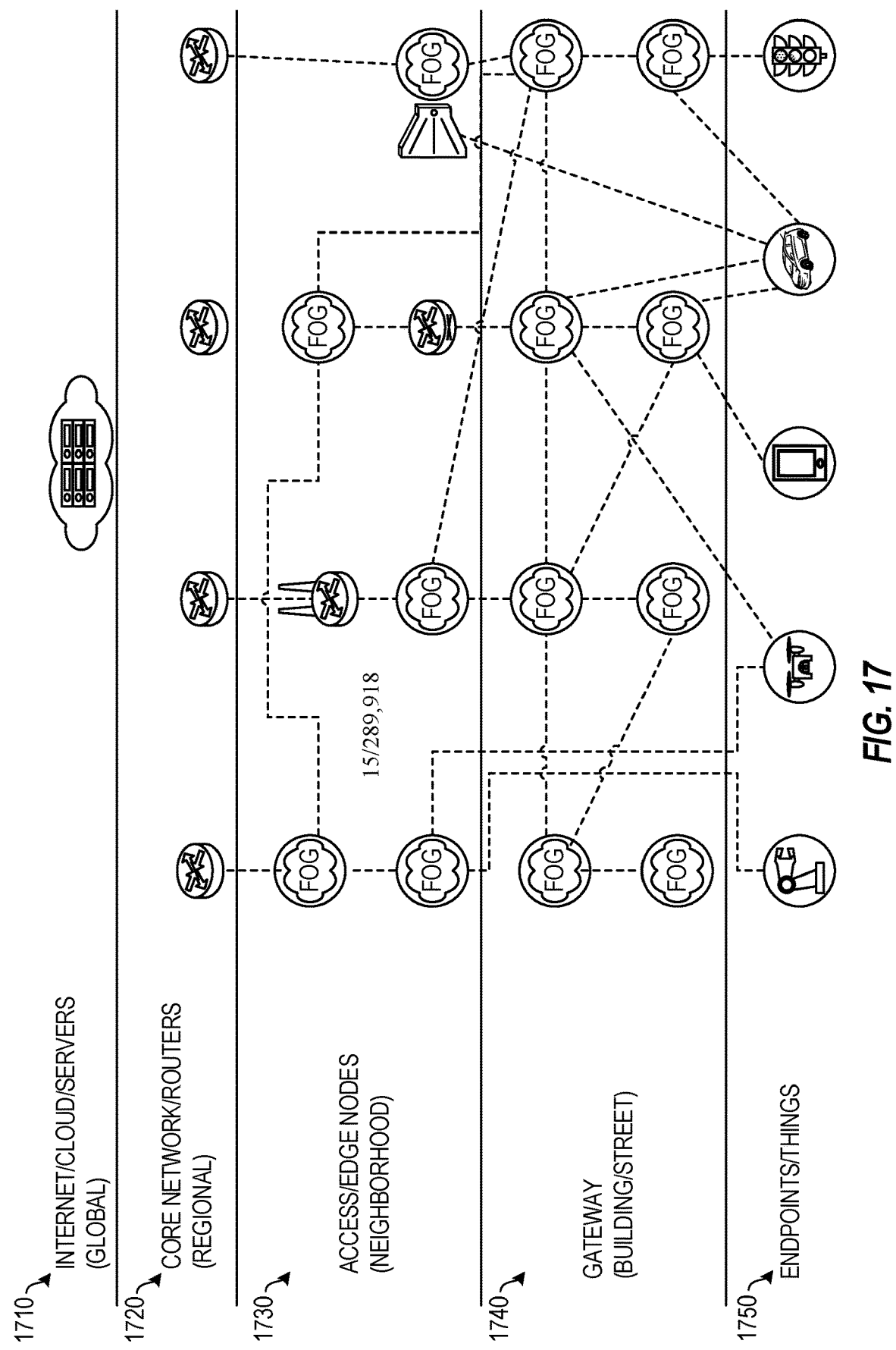
FIG. 17 illustrates a MEC and Fog network topology, according to an example.

FIG. 17 illustrates a MEC and Fog network topology, according to an example. This network topology, which includes a number of conventional networking layers, may be extended through use of the tags and objects discussed herein. Specifically, the relationships between endpoints (at endpoints/things network layer 1750), gateways (at gateway layer 1740), access or edge computing nodes (e.g., at neighborhood nodes layer 1730), core network or routers (e.g., at regional or central office layer 1720), may be represented through the use of linked objects and tag properties.

A Fog network (e.g., established at gateway layer 1740) may represent a dense geographical distribution of near-user edge devices (e.g., Fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 17 illustrates a general architecture that integrates a number of MEC and FOG nodes—categorized in different layers (based on their position, connectivity and processing capabilities, etc.). It will be understood, however, that such Fog nodes may be replaced or augmented by edge computing processing nodes.

Fog nodes may be categorized depending on the topology and the layer where they are located. In contrast, from a MEC standard perspective, each Fog node may be considered as a mobile edge (ME) Host, or a simple entity hosting a ME app and a light-weighted ME Platform. In an example, a MEC or Fog node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional client, V2V, and other network applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in the applicable communications context, a hierarchical structure of data processing and storage nodes may be defined. For example, including local ultra-low-latency processing, regional storage and processing as well as remote cloud data-center based storage and processing. SLAs, and KPIs, and other measures discussed herein may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 18:
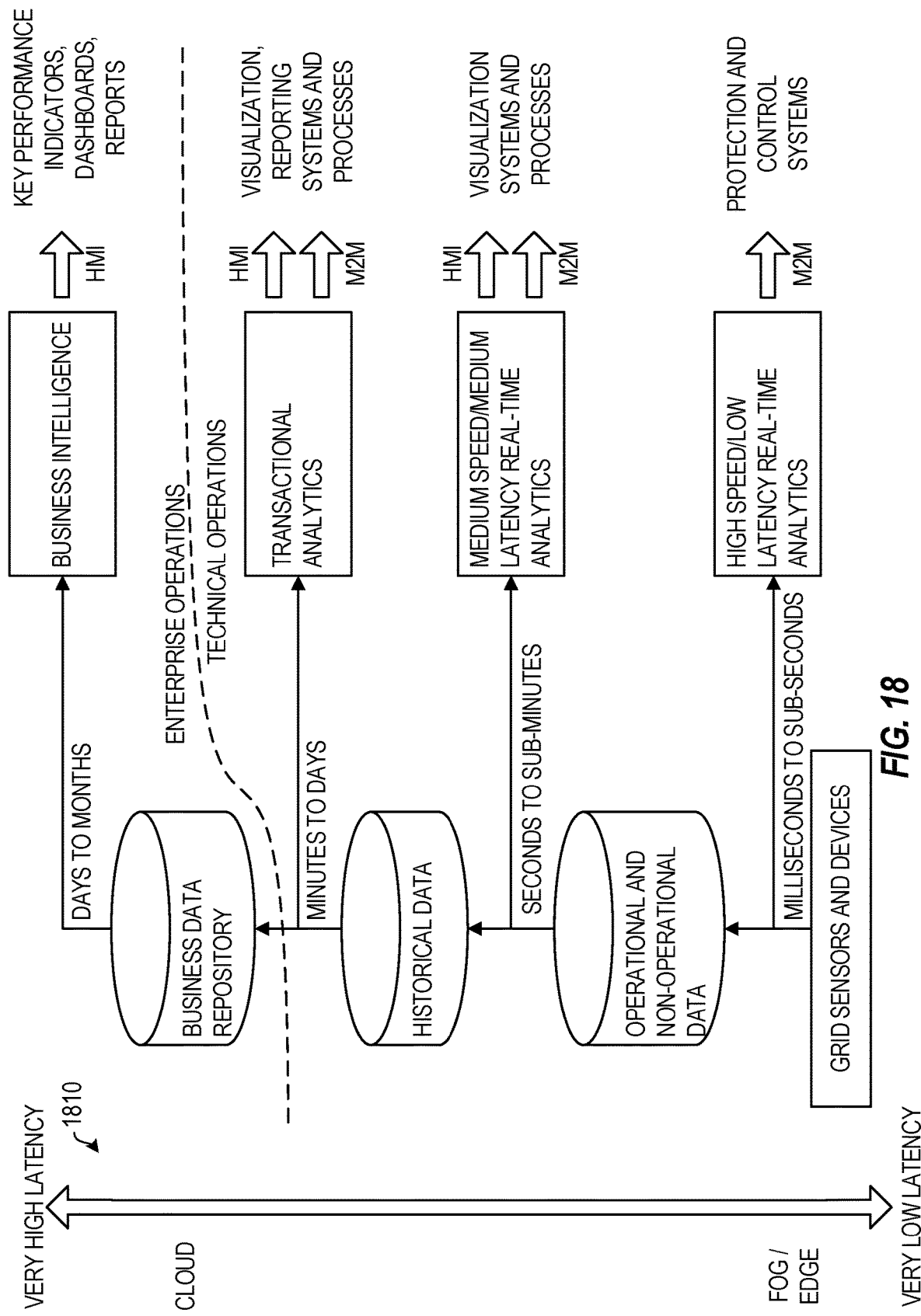
FIG. 18 illustrates processing and storage layers in a MEC and Fog network, according to an example.

FIG. 18 illustrates processing and storage layers in a MEC and Fog network, according to an example. The illustrated data storage or processing hierarchy 1810 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 19:
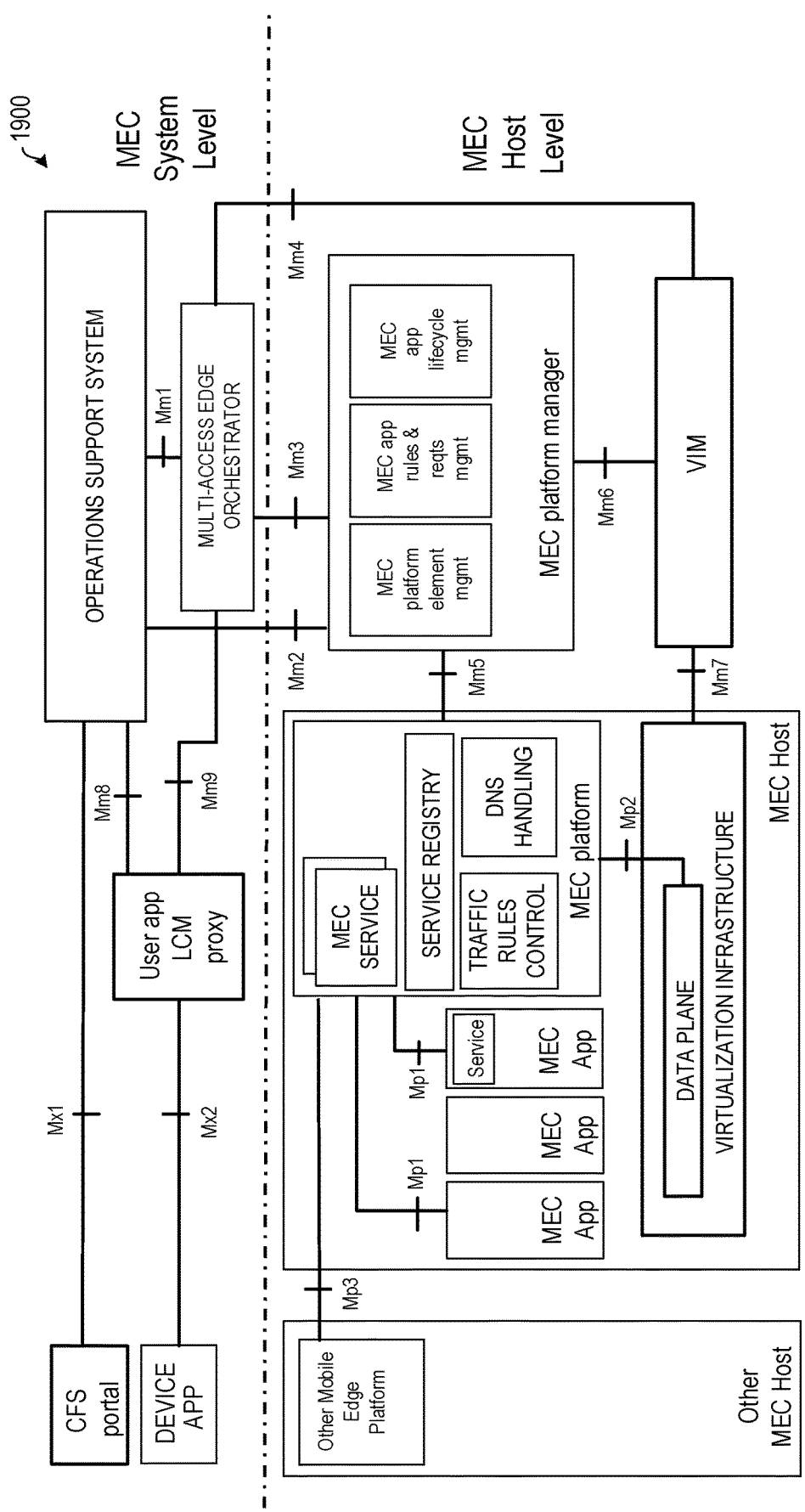
FIG. 19 illustrates a block diagram for a MEC system architecture, according to an example.

FIG. 19 depicts a block diagram for an example MEC system architecture in which any one or more of the techniques (e.g., operations, processes, methods, and methodologies) discussed herein may be performed. In an example, the MEC system architecture may be defined according to a specification, standard, or other definition (e.g., according to the ETSI GS MEC 003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 19, and the communications to perform network operations may be implemented at any number of the interfaces of the MEC system architecture depicted in FIG. 19.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

In further examples, the preceding examples of network communications and operations (e.g., with edge device deployments) may be integrated with IoT and like device-based network architectures. FIG. 17 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC and other Edge computing use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in SLA and service delivery agreements. As will be understood, the use of IoT devices and networks present a number of new challenges in a heterogeneous network of connectivity comprising a combination of wired and wireless technologies.

Figure 20:
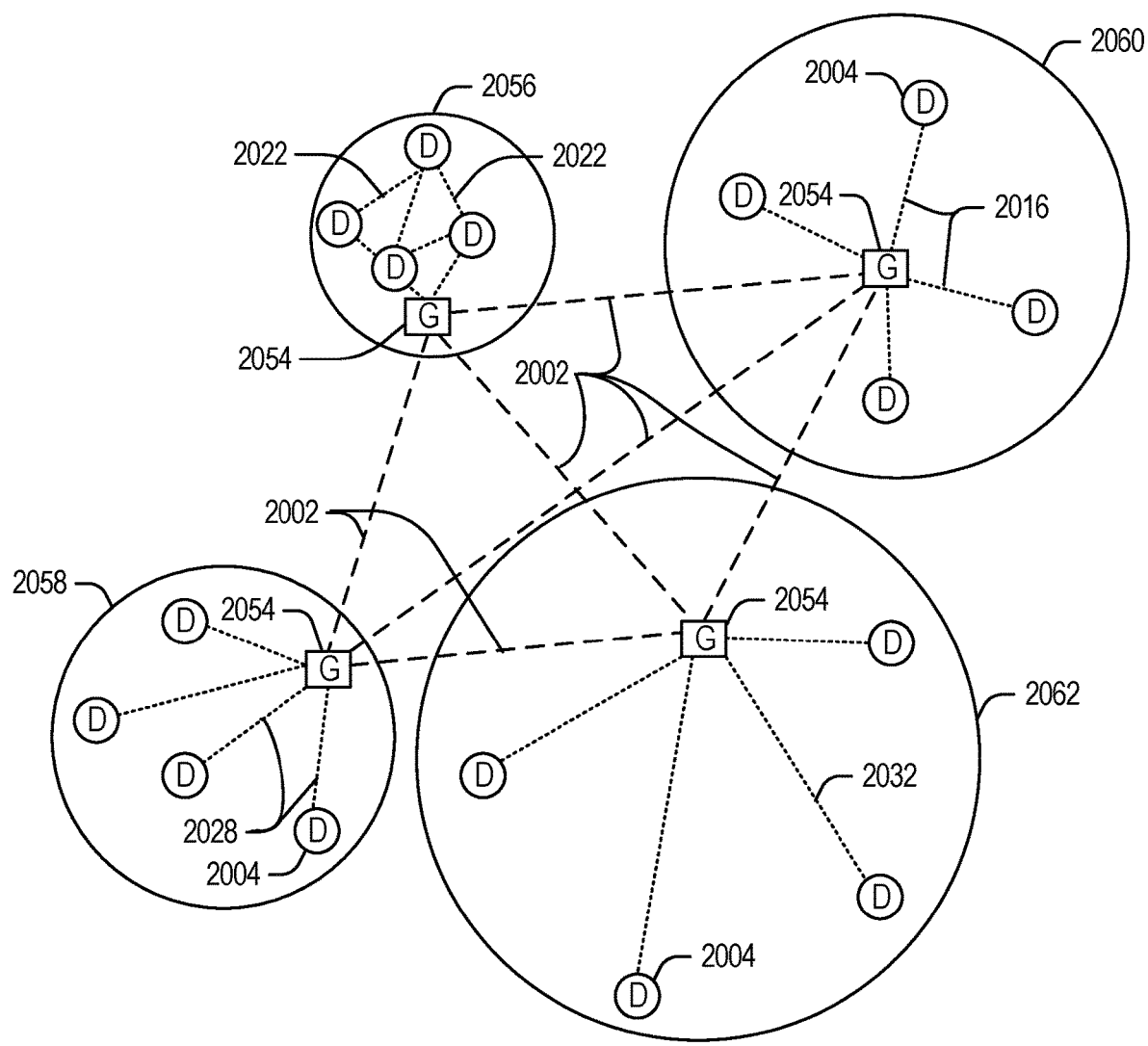
FIG. 20 illustrates a domain topology for respective device networks (e.g., internet-of-things (IoT) device networks) coupled through links to respective gateways, according to an example.

FIG. 20 specifically provides a simplified drawing of a domain topology that may be used for a number of IoT networks comprising IoT devices 2004, with the IoT networks 2056, 2058, 2060, 2062, coupled through backbone links 2002 to respective gateways 2054. For example, a number of IoT devices 2004 may communicate with a gateway 2054, and with each other through the gateway 2054. To simplify the drawing, not every IoT device 2004, or communications link (e.g., link 2016, 2022, 2028, or 2032) is labeled. The backbone links 2002 may include any number of wired or wireless technologies, including optical networks, and may be part of a local area network (LAN), a wide area network (WAN), or the Internet. Additionally, such communication links facilitate optical signal paths among both IoT devices 2004 and gateways 2054, including the use of MUXing/deMUXing components that facilitate interconnection of the various devices.

The network topology may include any number of types of IoT networks, such as a mesh network provided with the network 2056 using Bluetooth low energy (BLE) links 2022. Other types of IoT networks that may be present include a wireless local area network (WLAN) network 2058 used to communicate with IoT devices 2004 through IEEE 802.11 (Wi-Fi®) links 2028, a cellular network 2060 used to communicate with IoT devices 2004 through an LTE/LTE-A (4G) or 5G cellular network, and a low-power wide area (LPWA) network 2062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 2004, such as over the backbone links 2002, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 2056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 2058, for instance, may use systems that perform standards conversion to provide multi-standard connectivity, enabling IoT devices 2004 using different protocols to communicate. Further systems may provide seamless interconnectivity across a multi-standard infrastructure comprising visible Internet resources and hidden Internet resources.

Communications in the cellular network 2060, for instance, may be enhanced by systems that offload data, extend communications to more remote devices, or both. The LPWA network 2062 may include systems that perform non-Internet protocol (IP) to IP interconnections, addressing, and routing. Further, each of the IoT devices 2004 may include the appropriate transceiver for wide area communications with that device. Further, each IoT device 2004 may include other transceivers for communications using additional protocols and frequencies. This is discussed further with respect to the communication environment and hardware of an IoT processing device depicted in FIGS. 20 and 23.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 21 below.

Figure 21:
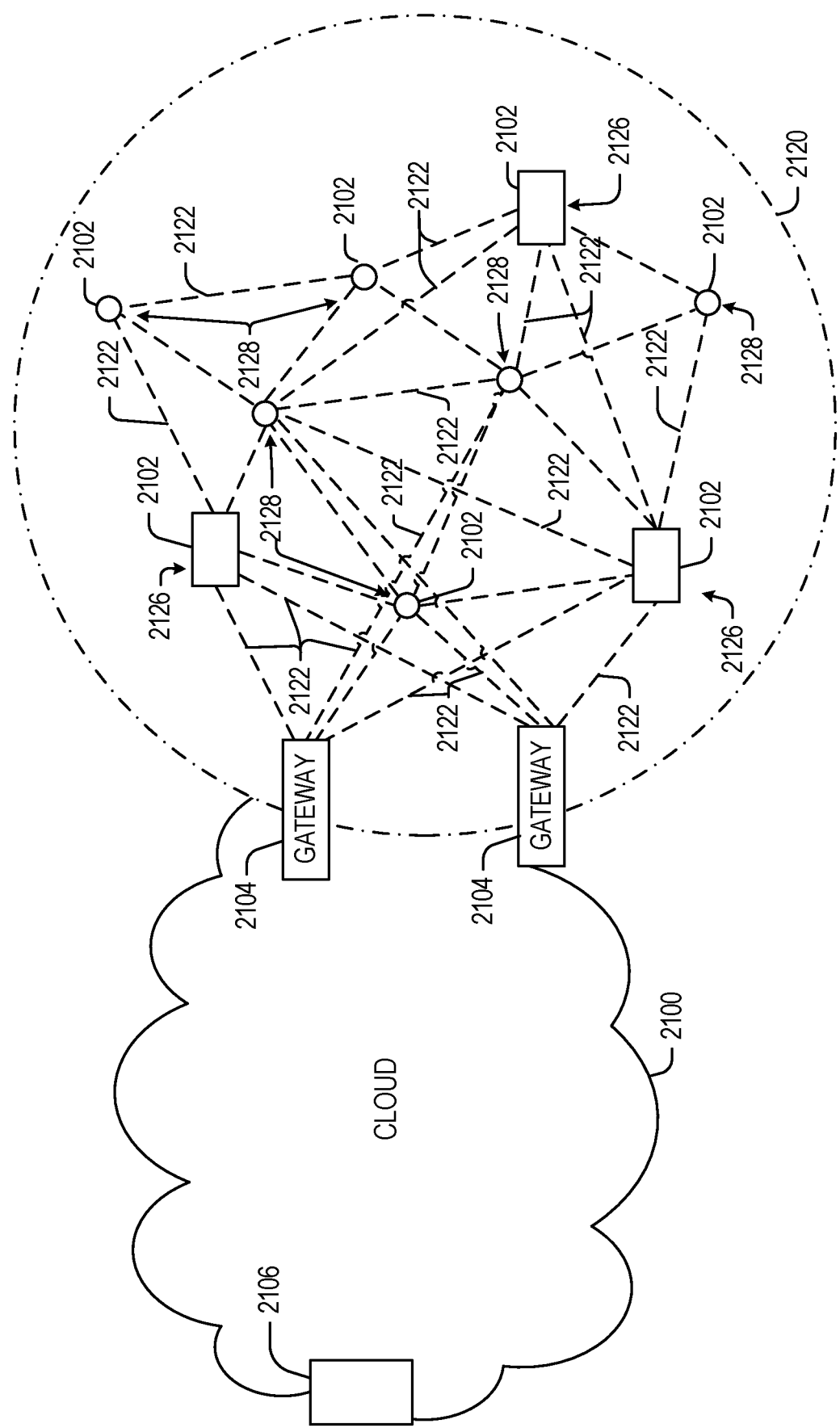
FIG. 21 illustrates a cloud-computing network in communication with a mesh network of IoT/endpoint devices operating as a Fog device at the edge of the cloud-computing network, according to an example.

FIG. 21 illustrates a cloud computing network in communication with a mesh network of IoT devices (devices 2102) operating as a fog platform in a networked scenario. The mesh network of IoT devices may be termed a fog network 2120, established from a network of devices operating at the edge of the cloud 2100. To simplify the diagram, not every IoT device 2102 is labeled.

The fog network 2120 may be considered to be a massively interconnected network wherein a number of IoT devices 2102 are in communications with each other, for example, by radio links 2122. The fog network 2120 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 2120 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 2102 are shown in this example, gateways 2104, data aggregators 2126, and sensors 2128, although any combinations of IoT devices 2102 and functionality may be used. The gateways 2104 may be edge devices that provide communications between the cloud 2100 and the fog 2120, and may also provide the backend process function for data obtained from sensors 2128, such as motion data, flow data, temperature data, and the like. The data aggregators 2126 may collect data from any number of the sensors 2128, and perform the back end processing function for the analysis. The results, raw data, or both may be passed along to the cloud 2100 through the gateways 2104. The sensors 2128 may be full IoT devices 2102, for example, capable of both collecting data and processing the data. In some cases, the sensors 2128 may be more limited in functionality, for example, collecting the data and enabling the data aggregators 2126 or gateways 2104 to process the data.

Communications from any IoT device 2102 may be passed along a convenient path (e.g., a most convenient path) between any of the IoT devices 2102 to reach the gateways 2104. In these networks, the number of interconnections provide substantial redundancy, enabling communications to be maintained, even with the loss of a number of IoT devices 2102. Further, the use of a mesh network may enable IoT devices 2102 that are very low power or located at a distance from infrastructure to be used, as the range to connect to another IoT device 2102 may be much less than the range to connect to the gateways 2104.

The fog 2120 provided from these IoT devices 2102 may be presented to devices in the cloud 2100, such as a server 2106, as a single device located at the edge of the cloud 2100, e.g., a fog device. In this example, the alerts coming from the fog device may be sent without being identified as coming from a specific IoT device 2102 within the fog 2120. In this fashion, the fog 2120 may be considered a distributed platform that provides computing and storage resources to perform processing or data-intensive tasks such as data analytics, data aggregation, and machine-learning, among others.

In some examples, the IoT devices 2102 may be configured using an imperative programming style, e.g., with each IoT device 2102 having a specific function and communication partners. However, the IoT devices 2102 forming the fog device may be configured in a declarative programming style, enabling the IoT devices 2102 to reconfigure their operations and communications, such as to determine needed resources in response to conditions, queries, and device failures. As an example, a query from a user located at a server 2106 about the operations of a subset of equipment monitored by the IoT devices 2102 may result in the fog 2120 device selecting the IoT devices 2102, such as particular sensors 2128, needed to answer the query. The data from these sensors 2128 may then be aggregated and analyzed by any combination of the sensors 2128, data aggregators 2126, or gateways 2104, before being sent on by the fog 2120 device to the server 2106 to answer the query. In this example, IoT devices 2102 in the fog 2120 may select the sensors 2128 used based on the query, such as adding data from flow sensors or temperature sensors. Further, if some of the IoT devices 2102 are not operational, other IoT devices 2102 in the fog 2120 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 22:
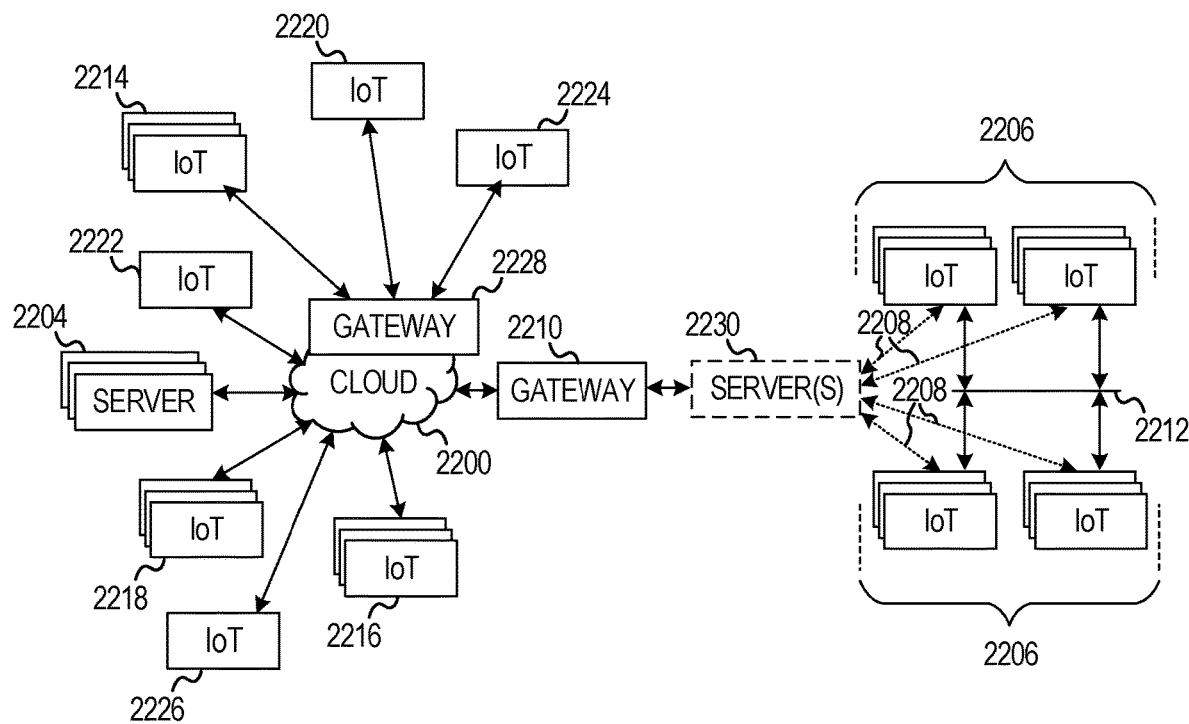
FIG. 22 illustrates a block diagram of a network illustrating communications among a number of IoT/endpoint devices, according to an example.

FIG. 22 illustrates a drawing of a cloud computing network, or cloud 2200, in communication with a number of IoT devices. The cloud 2200 may represent the Internet, or may be a local area network (LAN), or a wide area network (WAN), such as a proprietary network for a company. The IoT devices may include any number of different types of devices, grouped in various combinations. For example, a traffic control group 2206 may include IoT devices along streets in a city. These IoT devices may include stoplights, traffic flow monitors, cameras, weather sensors, and the like. The traffic control group 2206, or other subgroups, may be in communication with the cloud 2200 through wired or wireless links 2208, such as LPWA links, optical links, and the like. Further, a wired or wireless sub-network 2212 may allow the IoT devices to communicate with each other, such as through a local area network, a wireless local area network, and the like. The IoT devices may use another device, such as a gateway 2210 or 2228 to communicate with remote locations such as the cloud 2200; the IoT devices may also use one or more servers 2230 to facilitate communication with the cloud 2200 or with the gateway 2210. For example, the one or more servers 2230 may operate as an intermediate network node to support a local edge cloud or fog implementation among a local area network. Further, the gateway 2228 that is depicted may operate in a cloud-to-gateway-to-many edge devices configuration, such as with the various IoT devices 2214, 2220, 2224 being constrained or dynamic to an assignment and use of resources in the cloud 2200.

Other example groups of IoT devices may include remote weather stations 2214, local information terminals 2216, alarm systems 2218, automated teller machines 2220, alarm panels 2222, or moving vehicles, such as emergency vehicles 2224 or other vehicles 2226, among many others. Each of these IoT devices may be in communication with other IoT devices, with servers 2204, with another IoT fog platform or system, or a combination therein. The groups of IoT devices may be deployed in various residential, commercial, and industrial settings (including in both private or public environments).

As may be seen from FIG. 22, a large number of IoT devices may be communicating through the cloud 2200. This may allow different IoT devices to request or provide information to other devices autonomously. For example, a group of IoT devices (e.g., the traffic control group 2206) may request a current weather forecast from a group of remote weather stations 2214, which may provide the forecast without human intervention. Further, an emergency vehicle 2224 may be alerted by an automated teller machine 2220 that a burglary is in progress. As the emergency vehicle 2224 proceeds towards the automated teller machine 2220, it may access the traffic control group 2206 to request clearance to the location, for example, by lights turning red to block cross traffic at an intersection in sufficient time for the emergency vehicle 2224 to have unimpeded access to the intersection.

Clusters of IoT devices, such as the remote weather stations 2214 or the traffic control group 2206, may be equipped to communicate with other IoT devices as well as with the cloud 2200. This may allow the IoT devices to form an ad-hoc network between the devices, allowing them to function as a single device, which may be termed a fog platform or system (e.g., as described above with reference to FIG. 21).

Figure 23:
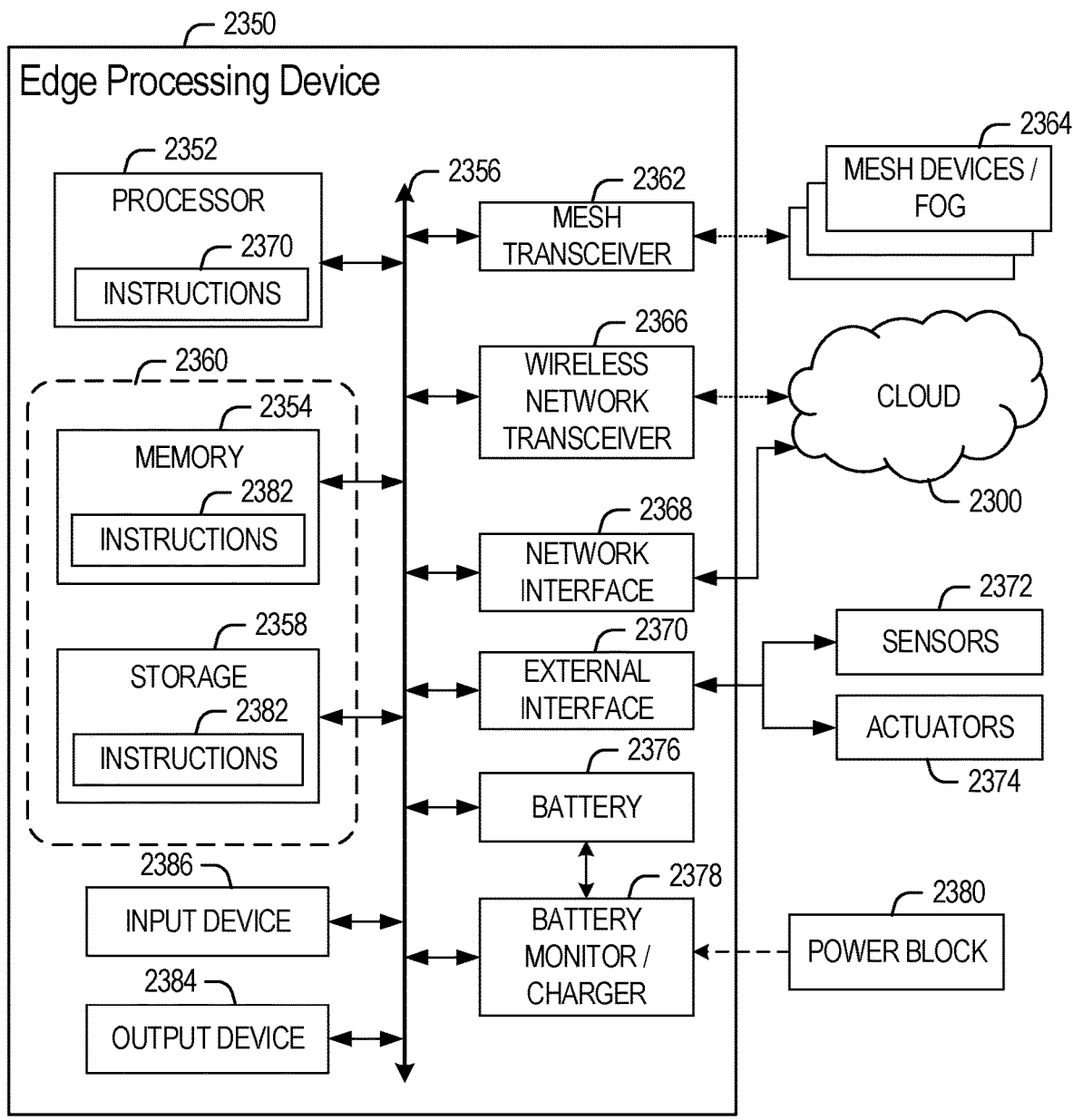
FIG. 23 illustrates a block diagram for an example device architecture upon which any one or more of the techniques (e.g., operations, processes, methods, and methodologies) discussed herein may be performed, according to an example.

FIG. 23 is a block diagram of an example of components that may be present in an edge processing device 2350 (e.g., a computer, IoT device, edge server, etc.) for implementing any of the techniques described herein. The device 2350 may include any combinations of the components shown in the example or referenced in the disclosure above. The components may be implemented as ICs, portions thereof, discrete electronic devices, or other modules, logic, hardware, software, firmware, or a combination thereof adapted in the device 2350, or as components otherwise incorporated within a chassis of a larger system. Additionally, the block diagram of FIG. 23 is intended to depict a high-level view of components of the device 2350. However, some of the components shown may be omitted, additional components may be present, and different arrangement of the components shown may occur in other implementations.

The device 2350 may include processing circuitry in the form of a processor 2352, which may be a microprocessor, a multi-core processor, a multithreaded processor, an ultra-low voltage processor, an embedded processor, or other known processing elements. The processor 2352 may be a part of a system on a chip (SoC) in which the processor 2352 and other components are formed into a single integrated circuit, or a single package, such as the Edison™ or Galileo™ SoC boards from Intel. As an example, the processor 2352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 2352 may communicate with a system memory 2354 over an interconnect 2356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2358 may also couple to the processor 2352 via the interconnect 2356. In an example the storage 2358 may be implemented via a solid state disk drive (SSDD). Other devices that may be used for the storage 2358 include flash memory cards, such as SD cards, microSD cards, xD picture cards, and the like, and USB flash drives. In low power implementations, the storage 2358 may be on-die memory or registers associated with the processor 2352. However, in some examples, the storage 2358 may be implemented using a micro hard disk drive (HDD). Further, any number of new technologies may be used for the storage 2358 in addition to, or instead of, the technologies described, such resistance change memories, phase change memories, holographic memories, or chemical memories, among others.

The components may communicate over the interconnect 2356. The interconnect 2356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2356 may be a proprietary bus, for example, used in a SoC based system. Other bus systems may be included, such as an I2C interface, an SPI interface, point to point interfaces, and a power bus, among others.

The interconnect 2356 may couple the processor 2352 to a mesh transceiver 2362, for communications with other mesh devices 2364. The mesh transceiver 2362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2362 may communicate using multiple standards or radios for communications at different range. For example, the device 2350 may communicate with close devices, e.g., within about 10 meters, using a local transceiver based on BLE, or another low power radio, to save power. More distant mesh devices 2364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2366 may be included to communicate with devices or services in the cloud 2300 via local or wide area network protocols. The wireless network transceiver 2366 may be a LPWA transceiver that follows the IEEE 802.15.4, or IEEE 802.15.4g standards, among others. The device 2350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2362 and wireless network transceiver 2366, as described herein. For example, the radio transceivers 2362 and 2366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2362 and 2366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2368 may be included to provide a wired communication to the cloud 2300 or to other devices, such as the mesh devices 2364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2368 may be included to enable connect to a second network, for example, a NIC 2368 providing communications to the cloud over Ethernet, and a second NIC 2368 providing communications to other devices over another type of network.

Given the variety of types of applicable communications from the device to another component or network, applicable communications circuitry used by the device may include or be embodied by any one or more of components 2362, 2366, 2368, or 2370. Accordingly, in various examples, applicable means for communicating (e.g., receiving, transmitting, etc.) may be embodied by such communications circuitry.

The interconnect 2356 may couple the processor 2352 to an external interface 2370 that is used to connect external devices or subsystems. The external devices may include sensors 2372, such as accelerometers, level sensors, flow sensors, optical light sensors, camera sensors, temperature sensors, a global positioning system (GPS) sensors, pressure sensors, barometric pressure sensors, and the like. The external interface 2370 further may be used to connect the device 2350 to actuators 2374, such as power switches, valve actuators, an audible sound generator, a visual warning device, and the like.

In some optional examples, various input/output (I/O) devices may be present within, or connected to, the device 2350. For example, a display or other output device 2384 may be included to show information, such as sensor readings or actuator position. An input device 2386, such as a touch screen or keypad may be included to accept input. An output device 2384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 2350.

A battery 2376 may power the device 2350, although in examples in which the device 2350 is mounted in a fixed location, it may have a power supply coupled to an electrical grid. The battery 2376 may be a lithium ion battery, or a metal-air battery, such as a zinc-air battery, an aluminum-air battery, a lithium-air battery, and the like.

A battery monitor/charger 2378 may be included in the device 2350 to track the state of charge (SoCh) of the battery 2376. The battery monitor/charger 2378 may be used to monitor other parameters of the battery 2376 to provide failure predictions, such as the state of health (SoH) and the state of function (SoF) of the battery 2376. The battery monitor/charger 2378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2378 may communicate the information on the battery 2376 to the processor 2352 over the interconnect 2356. The battery monitor/charger 2378 may also include an analog-to-digital (ADC) convertor that enables the processor 2352 to directly monitor the voltage of the battery 2376 or the current flow from the battery 2376. The battery parameters may be used to determine actions that the device 2350 may perform, such as transmission frequency, mesh network operation, sensing frequency, and the like.

A power block 2380, or other power supply coupled to a grid, may be coupled with the battery monitor/charger 2378 to charge the battery 2376. In some examples, the power block 2380 may be replaced with a wireless power receiver to obtain the power wirelessly, for example, through a loop antenna in the device 2350. A wireless battery charging circuit, such as an LTC4020 chip from Linear Technologies of Milpitas, Calif., among others, may be included in the battery monitor/charger 2378. The specific charging circuits chosen depend on the size of the battery 2376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2358 may include instructions 2382 in the form of software, firmware, or hardware commands to implement the techniques described herein. Although such instructions 2382 are shown as code blocks included in the memory 2354 and the storage 2358, it may be understood that any of the code blocks may be replaced with hardwired circuits, for example, built into an application specific integrated circuit (ASIC).

In an example, the instructions 2382 provided via the memory 2354, the storage 2358, or the processor 2352 may be embodied as a non-transitory, machine readable medium 2360 including code to direct the processor 2352 to perform electronic operations in the device 2350. The processor 2352 may access the non-transitory, machine readable medium 2360 over the interconnect 2356. For instance, the non-transitory, machine readable medium 2360 may be embodied by devices described for the storage 2358 or may include specific storage units such as optical disks, flash drives, or any number of other hardware devices. The non-transitory, machine-readable medium 2360 may include instructions to direct the processor 2352 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus of a multi-access edge computing (MEC) component, of a first MEC system, for discovering platforms in MEC systems, comprising: processing circuitry; and a memory device including instructions embodied thereon, wherein the instructions, which when executed by the processing circuitry, configure the processing circuitry to perform operations to: receive, from a dedicated reference point, a list of MEC system identifiers, the MEC system identifiers comprising a system identifier of a second, different MEC system; and receive a list of available MEC hosts in the second MEC system that fulfill a predefined requirement; determine a list of shareable services on the first MEC system; and provide information to the second MEC system regarding the list of shareable services on the first MEC system.

In Example 2, the subject matter of Example 1 includes, subject matter where an intelligent transportation system (ITS) service area is represented by a system identifier of the first MEC system and the system identifier of the second MEC system.

In Example 3, the subject matter of Example 2 includes, subject matter where the processing circuitry further performs operations to: determine a set of available MEC hosts within the first MEC system that fulfill a local predefined requirement; and transmit identifiers that identify the set of available MEC hosts to the second MEC system.

In Example 4, the subject matter of Example 3 includes, subject matter where the local predefined requirement is based on processing capacity.

In Example 5, the subject matter of Examples 3-4 includes, subject matter where the local predefined requirement is based on memory capacity.

In Example 6, the subject matter of Examples 2-5 includes, subject matter where the processing circuitry further performs operations to: determine a change in vehicle spatial densification over a time period; and transmit the system identifier for the first MEC system to the second MEC system based on the change in vehicle spatial densification.

In Example 7, the subject matter of Examples 2-6 includes, subject matter where the processing circuitry further performs operations to: receive service identifiers that indicate shareable services of the second MEC system; and transmit a list of available service identifiers available within the first MEC system to the second MEC system, wherein the list of available service identifiers comprises at least one service identifier from the service identifiers received from the second MEC system.

In Example 8, the subject matter of Examples 2-7 includes, subject matter where the processing circuitry further performs operations to: determine a list of shareable services within the first MEC system that are shareable with other MEC systems; and transmit a list of shareable service identifiers that identify the list of shareable services to the second MEC system.

In Example 9, the subject matter of Examples 1-8 includes, subject matter where the processing circuitry further performs operations to transmit, to a first vehicle, information regarding a cache exchange opportunity with a second vehicle, wherein the information comprises a time span for the cache exchange opportunity based on speeds of the first vehicle and the second vehicle.

In Example 10, the subject matter of Examples 1-9 includes, subject matter where the list of MEC system identifiers is received via a MEC orchestrator (MEO).

Example 11 is a method of a first multi-access edge computing (MEC) system for discovering platforms in MEC systems, comprising: receiving, from a dedicated reference point, a list of MEC system identifiers, the MEC system identifiers comprising a system identifier of a second, different MEC system; receiving a list of available MEC hosts in the second MEC system that fulfill a predefined requirement; determining a list of shareable services on the first MEC system; and providing information to the second MEC system regarding the list of shareable services on the first MEC system.

In Example 12, the subject matter of Example 11 includes, wherein an intelligent transportation system (ITS) service area is represented by a system identifier of the first MEC system and the system identifier of the second MEC system.

In Example 13, the subject matter of Example 12 includes, determining a set of available MEC hosts within the first MEC system that fulfill a local predefined requirement; and transmitting identifiers that identify the set of available MEC hosts to the second MEC system.

In Example 14, the subject matter of Example 13 includes, subject matter where the local predefined requirement is based on processing capacity.

In Example 15, the subject matter of Examples 13-14 includes, subject matter where the local predefined requirement is based on memory capacity.

In Example 16, the subject matter of Examples 12-15 includes, determining a change in vehicle spatial densification over a time period; and transmitting the system identifier for the first MEC system to the second MEC system based on the change in vehicle spatial densification.

In Example 17, the subject matter of Examples 12-16 includes, receiving service identifiers that indicate shareable services of the second MEC system; and transmitting a list of available service identifiers available within the first MEC system to the second MEC system, wherein the list of available service identifiers comprises at least one service identifier from the service identifiers received from the second MEC system.

In Example 18, the subject matter of Examples 12-17 includes, determining a list of shareable services within the first MEC system that are shareable with other MEC systems; and transmitting a list of shareable service identifiers that identify the list of shareable services to the second MEC system.

In Example 19, the subject matter of Examples 11-18 includes, transmitting, to a first vehicle, information regarding a cache exchange opportunity with a second vehicle, wherein the information comprises a time span for the cache exchange opportunity based on speeds of the first vehicle and the second vehicle.

In Example 20, the subject matter of Examples 11-19 includes, subject matter where the list of MEC system identifiers is received via a MEC orchestrator (MEO).

Example 21 is at least one machine-readable storage device comprising instructions stored thereupon, which when executed by a processing circuitry of a computing device, cause the processing circuitry to: receive, from a dedicated reference point, a list of MEC system identifiers, the MEC system identifiers comprising a system identifier of a second, different MEC system; and receive a list of available MEC hosts in the second MEC system that fulfill a predefined requirement; determine a list of shareable services on the first MEC system; and provide information to the second MEC system regarding the list of shareable services on the first MEC system.

In Example 22, the subject matter of Example 21 includes, subject matter where an intelligent transportation system (ITS) service area is represented by a system identifier of the first MEC system and the system identifier of the second MEC system.

In Example 23, the subject matter of Example 22 includes, subject matter where the processing circuitry further performs operations to: determine a set of available MEC hosts within the first MEC system that fulfill a local predefined requirement; and transmit identifiers that identify the set of available MEC hosts to the second MEC system.

In Example 24, the subject matter of Example 23 includes, subject matter where the local predefined requirement is based on processing capacity.

In Example 25, the subject matter of Examples 23-24 includes, subject matter where the local predefined requirement is based on memory capacity.

In Example 26, the subject matter of Examples 22-25 includes, subject matter where the processing circuitry further performs operations to: determine a change in vehicle spatial densification over a time period; and transmit the system identifier for the first MEC system to the second MEC system based on the change in vehicle spatial densification.

In Example 27, the subject matter of Examples 22-26 includes, subject matter where the processing circuitry further performs operations to: receive service identifiers that indicate shareable services of the second MEC system; and transmit a list of available service identifiers available within the first MEC system to the second MEC system, wherein the list of available service identifiers comprises at least one service identifier from the service identifiers received from the second MEC system.

In Example 28, the subject matter of Examples 22-27 includes, subject matter where the processing circuitry further performs operations to: determine a list of shareable services within the first MEC system that are shareable with other MEC systems; and transmit a list of shareable service identifiers that identify the list of shareable services to the second MEC system.

In Example 29, the subject matter of Examples 21-28 includes, subject matter where the processing circuitry further performs operations to transmit, to a first vehicle, information regarding a cache exchange opportunity with a second vehicle, wherein the information comprises a time span for the cache exchange opportunity based on speeds of the first vehicle and the second vehicle.

In Example 30, the subject matter of Examples 21-29 includes, subject matter where the list of MEC system identifiers is received via a MEC orchestrator (MEO).

Example 31 is at least one machine-readable medium including instructions that, when executed by processing circuitry, cause the processing circuitry to perform operations to implement of any of Examples 1-30.

Example 32 is at least one machine-readable storage medium, comprising information representative of instructions that, when executed by processing circuitry, cause the processing circuitry to, perform the operations of any of Examples 1-30.

Example 33 may include one or more non-transitory computer-readable media comprising instructions to cause an electronic device, upon execution of the instructions by one or more processors of the electronic device, to perform one or more elements of a method described in or related to any of Examples 1-30, or any other method or process described herein.

Example 34 may include an apparatus comprising logic, modules, or circuitry to perform one or more elements of a method described in or related to any of Examples 1-30, or any other method or process described herein.

Example 35 may include a method, technique, or process as described in or related to any of Examples 1-30, or portions or parts thereof Example 36 may include an apparatus comprising: one or more processors and one or more computer readable media comprising instructions that, when executed by the one or more processors, cause the one or more processors to perform the method, techniques, or process as described in or related to any of Examples 1-30, or portions thereof Example 37 may include a signal as described in or related to any of examples 1-30, or portions or parts thereof.

Example 38 may include a signal in a wireless network as described in or related to any of Examples 1-30, or as otherwise shown and described herein.

Example 39 may include a method of coordinating communications in a wireless network as described in or related to any of Examples 1-30, or as otherwise shown and described herein.

Example 40 may include a device for processing communication as described in or related to any of Examples 1-30, or as otherwise shown and described herein.

Example 41 is a network comprising respective devices and device communication mediums for performing any of the operations of Examples 1-30, or as otherwise shown and described herein.

Example 42 is an edge cloud computing device implementation comprising processing nodes and computing units adapted for performing any of the operations of Examples 1-30, or as otherwise shown and described herein.

Example 43 is an apparatus comprising means to implement of any of Examples 1-42.

Example 44 is a system to implement of any of Examples 1-42.

Example 45 is a method to implement of any of Examples 1-42.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus of a multi-access edge computing (MEC) component, of a first MEC system; for discovering platforms in MEC systems, comprising:
   processing circuitry; and
   a memory device including instructions embodied thereon, wherein the instructions, which when executed by the processing circuitry, configure the processing circuitry to perform operations to:
     receive, from a dedicated reference point, a list of MEC system identifiers, the MEC system identifiers comprising a system identifier of a second, different MEC system;
     receive a list of available MEC hosts in at least one platform of the second MEC system that fulfill a predefined requirement;
     determine a list of shareable services on at least one platform of the first MEC system;
     provide information to the second MEC system regarding the list of shareable services on the at least one platform of the first MEC system;
     determine a change in vehicle spatial densification over a time period; and
     transmit a system identifier for the first MEC system to the second MEC system based on the change in vehicle spatial densification.

2. The apparatus of claim 1, wherein an intelligent transportation system (ITS) service area is represented by the system identifier of the first MEC system and the system identifier of the second MEC system.

3. The apparatus of claim 2, wherein the processing circuitry further performs operations to:
   determine a set of available MEC hosts within the at least one platform of the first MEC system that fulfill a local predefined requirement; and
   transmit identifiers that identify the set of available MEC hosts to the second MEC system.

4. The apparatus of claim 3, wherein the local predefined requirement is based on processing capacity.

5. The apparatus of claim 3, wherein the local predefined requirement is based on memory capacity.

6. The apparatus of claim 2, wherein the processing circuitry further performs operations to:
receive service identifiers that indicate shareable services of the second MEC system; and
transmit a list of available service identifiers available within the first MEC system to the second MEC system, wherein the list of available service identifiers comprises at least one service identifier from the service identifiers received from the second MEC system.

7. The apparatus of claim 2, wherein the processing circuitry further performs operations to:
determine a list of shareable services within the at least one platform of the first MEC system that are shareable with other MEC systems; and
transmit a list of shareable service identifiers that identify the list of shareable services to the at least one platform of the second MEC system.

8. The apparatus of claim 1, wherein the processing circuitry further performs operations to, if database coherence between the first vehicle and the second vehicle is to be undertaken, exchange most recent information in caches of the first vehicle and the second vehicle.

9. The apparatus of claim 8, wherein the information in the caches of the first vehicle and the second vehicle comprise, for each piece of information in the first vehicle and the second vehicle to be exchanged, a cache coherence flag linked with a timing indication indicating when the piece of information in the first vehicle and the second vehicle was collected.

10. The apparatus of claim 9, wherein the cache coherence flag comprises a coherence attribute selected from:
a first plurality of attributes that includes: "COHERENCE IS ESSENTIAL", "COHERENCE IS BENEFICIAL", "COHERENCE IS OPTIONAL", and "COHERENCE IS NOT REQUIRED", or
a second plurality of attributes that includes: "UP TO DATE COHERENCE IS REQUIRED", "MINUTES-old COHERENCE IS SUFFICIENT" "HOURS-old COHERENCE IS SUFFICIENT", and "NO COHERENCE IS REQUIRED".

11. The apparatus of claim 1, wherein the processing circuitry further performs operations to transmit, to a first vehicle, information regarding a cache exchange opportunity with a second vehicle, wherein the information comprises a time span for the cache exchange opportunity based on speeds of the first vehicle and the second vehicle.

12. The apparatus of claim 1, wherein:
the processing circuitry further performs operations to determine the list of shareable services on the at least one platform of the first MEC system based on a tag for each service of the list of shareable services,
the tag is configured to indicate whether a service of the list of shareable services is sharable or private, and
a private service is unable to be consumed locally from inter-system inter-platform sharing.

13. The apparatus of claim 1, wherein the dedicated reference point is provided by a dedicated communication interface established directly between (i) a MEC orchestrator of the first MEC system and a MEC orchestrator of the second MEC system, or (ii) a MEC platform manager of the first MEC system and a MEC platform manager of the second MEC system.

14. A method of a multi-access edge computing (MEC) component, of a first MEC system, for discovering platforms in MEC systems, comprising:

receiving, from a dedicated reference point, a list of MEC system identifiers, the MEC system identifiers comprising a system identifier of a second, different MEC system;
receiving a list of available MEC hosts in at least one platform of the second MEC system that fulfill a predefined requirement;
determining a list of shareable services on at least one platform of the first MEC system;
providing information to the second MEC system regarding the list of shareable services on the at least one platform of the first MEC system;
determining a change in vehicle spatial densification over a time period; and
transmitting a system identifier for the first MEC system to the second MEC system based on the change in vehicle spatial densification.

15. The method of claim 14, wherein an intelligent transportation system (ITS) service area is represented by the system identifier of the first MEC system and the system identifier of the second MEC system.

16. The method of claim 15, further comprising:
determining a set of available MEC hosts within the at least one platform of the first MEC system that fulfill a local predefined requirement; and
transmitting identifiers that identify the set of available MEC hosts to the second MEC system.

17. The method of claim 16, wherein the local predefined requirement is based on processing capacity.

18. The method of claim 16, wherein the local predefined requirement is based on memory capacity.

19. The method of claim 15, further comprising:
receiving service identifiers that indicate shareable services of the second MEC system; and
transmitting a list of available service identifiers available within the first MEC system to the second MEC system, wherein the list of available service identifiers comprises at least one service identifier from the service identifiers received from the second MEC system.

20. The method of claim 15, further comprising:
determining a list of shareable services within the at least one platform of the first MEC system that are shareable with other MEC systems; and
transmitting a list of shareable service identifiers that identify the list of shareable services to the at least one platform of the second MEC system.

21. The method of claim 14, further comprising transmitting, to a first vehicle, information regarding a cache exchange opportunity with a second vehicle, wherein the information comprises a time span for the cache exchange opportunity based on speeds of the first vehicle and the second vehicle.

22. At least one non-transitory machine-readable storage device comprising instructions stored thereupon, which when executed by a processing circuitry of a computing device of a first MEC system, cause the processing circuitry to:
receive, from a dedicated reference point, a list of MEC system identifiers, the MEC system identifiers comprising a system identifier of a second; different MEC system;
receive a list of available MEC hosts in at least one platform of the second MEC system that fulfill a predefined requirement;
determine a list of shareable services on at least one platform of the first MEC system;

provide information to the second MEC system regarding the list of shareable services on the at least one platform of the first MEC system;

determine a change in vehicle spatial densification over a time period; and transmit a system identifier for the first MEC system to the second MEC system based on the change in vehicle spatial densification.

23. The at least one non-transitory machine-readable storage device of claim 22, wherein an intelligent transportation system (ITS) service area is represented by the system identifier of the first MEC system and the system identifier of the second MEC system.

24. The at least one non-transitory machine-readable storage device of claim 23, wherein the processing circuitry further performs operations to:

determine a set of available MEC hosts within the first MEC system that fulfill a local predefined requirement; and transmit identifiers that identify the set of available MEC hosts to the second MEC system.

25. The at least one non-transitory machine-readable storage device of claim 24, wherein the local predefined requirement is based on processing capacity.

26. The at least one non-transitory machine-readable storage device of claim 24, wherein the local predefined requirement is based on memory capacity.

* * * * *